(12) United States Patent
Beaty

(10) Patent No.: US 10,148,786 B1
(45) Date of Patent: Dec. 4, 2018

(54) METHOD OF GENERATING A UNIFIED USER PROFILE

(71) Applicant: RedCritter Corp, Flower Mound, TX (US)

(72) Inventor: Robert M Beaty, Flower Mound, TX (US)

(73) Assignee: RedCritter Corp., Flower Mound, TX (US)

( * ) Notice: Subject to any disclaimer, the term of this patent is extended or adjusted under 35 U.S.C. 154(b) by 207 days.

(21) Appl. No.: 14/809,251

(22) Filed: Jul. 26, 2015

(51) Int. Cl.
 *H04L 29/08* (2006.01)
 *G06Q 50/00* (2012.01)
 *H04L 29/06* (2006.01)

(52) U.S. Cl.
 CPC ........... *H04L 67/306* (2013.01); *G06Q 50/01* (2013.01); *H04L 65/403* (2013.01)

(58) Field of Classification Search
 CPC ...... H04L 67/306; H04L 65/403; G06Q 50/01
 See application file for complete search history.

(56) References Cited

U.S. PATENT DOCUMENTS

| 9,424,612 | B1* | 8/2016 | Bright | G06F 17/30867 |
| 9,876,743 | B1* | 1/2018 | Vippagunta | H04L 51/14 |
| 2011/0288912 | A1* | 11/2011 | McCrea | G06Q 30/02 |
| | | | | 705/14.2 |
| 2012/0054002 | A1* | 3/2012 | Rotbard | G06Q 20/20 |
| | | | | 705/14.3 |
| 2013/0291065 | A1* | 10/2013 | Jakowski | G06F 15/16 |
| | | | | 726/4 |
| 2014/0096215 | A1* | 4/2014 | Hessler | H04L 63/0869 |
| | | | | 726/7 |
| 2014/0181517 | A1* | 6/2014 | Alaranta | H04L 63/062 |
| | | | | 713/168 |
| 2016/0125361 | A1* | 5/2016 | Vivas | G06Q 10/1053 |
| | | | | 705/319 |
| 2017/0366641 | A1* | 12/2017 | Fultz | H04L 67/306 |

OTHER PUBLICATIONS

"www.redcrittertracker.com", Feb. 15, 2012, wayback machine archive.org, 13 pages.*

* cited by examiner

*Primary Examiner* — Brian J. Gillis
*Assistant Examiner* — Amy C Ling
(74) *Attorney, Agent, or Firm* — Kirton McConkie; Brian Tucker

(57) ABSTRACT

We disclose a system, method and software product for creating and updating a unified subject's profile. The system, method, and software product may include a computer processing means and computer readable medium, and a proximity device. The system may permit publishing icons to a user profile by multiple applications. The system may update the user profile to reflect various awards from multiple publishers. The system may also generate a visual indicator for display on a subject profile to demonstrate a skill, achievement, or other information associated with the activity. The system may also provide a manner of verifying the authenticity and identity of the publisher.

15 Claims, 30 Drawing Sheets

METHOD OF GENERATING A UNIFIED USER PROFILE

CROSS-REFERENCE TO RELATED APPLICATIONS

The present patent document claims the benefit of the filing date of U.S. patent application Ser. No. 14/262,671 filed Apr. 25, 2014, which claims the benefit of the filing date under 35 U.S.C. § 119(e) of Provisional Patent Application Ser. No. 61/816,675 filed Apr. 26, 2013, and Provisional Patent Application Ser. No. 61/838,571, filed Jun. 24, 2013, each of which are hereby incorporated by reference in their entirety.

BACKGROUND

The internet has grown as a communication device. Individuals increasingly rely on internet websites such as LINKEDIN.COM and FACEBOOK.COM to create profiles communicating information about their interests, skills, and achievements. For example, LINKEDIN.COM permits users to create professional profiles and create an online resume. Online profiles usually include information about work history, publications, education, association membership, and may also include information about the books the individual is reading. Online profile information is communicated in text format Other online profile sites such as TWITTER, FOURSQUARE, and FACEBOOK may provide a space for an individual to communicate real time reports of the individual's location and activities (e.g., "just checked in at STARBUCKS", or "Attending TEDx.")

Current systems such as those listed above and similar "sister" systems are based exclusively on self-reporting. For example, in order to build a profile, the user logs into the account and manually populates the account with information, for example but not limited to, work history, skills, and achievements.

BRIEF SUMMARY

A system, method, and software product for unifying from various publishers (e.g., employers, vendors, leisure organizations, etc.) information about a person's skills, activities, and achievements. The method involves providing a system that unifies data from multiple publishers into a single user account, which data may be displayed on a unified user profile. The system, method, and software product may exist and/or operate, for example, on the internet or in the cloud.

The system, method, and software product includes (among others) user profiles, publishers, publisher profiles, and various applications. For illustration purposes, we refer to users and publishers. A user may be an individual having a user profile on the system. Information about the user is displayed on the user profile, e.g., in the form of icons, badges, certificates, or other visible representation. Examples of information include skills, activities, achievements, work history, education history, and similar. In one variation, the information is published to the user profile by a publisher. The publisher may be an organization or entity, for example but not limited to, a corporation (e.g., a corporation that employs the user), an educational organization, a charitable organization, a social organization, or otherwise. A publisher may be any entity with which a user has an information generating interaction. The publisher may have a publisher profile. A publisher, in some cases, may be a user in its relationship to other publishers. The system, method, and software product may operate with little or no self-reporting. For example, the system may be completely or substantially populated by publishers.

We provide an example of the difference between manual reporting (as used on profile sites such as LINKEDIN and FACEBOOK). An individual populating a LINKEDIN profile would manually list that it worked for Company A for 7 years, that it performed the skill of database management for that company, and that it earned a Rotary Club award for distinguished service. We disclose a system, method and software product by which Company A would publish to the individual's user profile a badge indicating that the individual worked there for 7 years, Company A would publish to the individual's profile a badge indicating that the individual performed database management, and the Rotary Club would publish to the individual's profile a badge indicating that the individual earned an award for distinguished service. The difference is that in the second scenario, the user profile has more veracity. It is less subject to self-reporting bias because the information was reported by the entity rather than by the user. Furthermore, the second scenario lowers the chance of under-reporting bias because the individual's achievements are reported by the publisher and therefore the individual is less likely to forget and leave off information.

The system, method, and software product disclosed herein may reduce self-reporting bias, under-reporting bias (individuals with time restraints unable to fully communicate the breadth of their work) and out of date information.

The system, method, and software product may facilitate automatic publishing of information to a user profile. For example, a publisher may use the system, method, and software product to gamify an existing business system, such as an ERP system, a productivity system, time keeping system, project management system, or otherwise. The publisher may create an application within the system, method, and software product for publishing to individual user profiles badges upon the accomplishment of criteria. In one example, the publisher may use the unified system to set action parameters, such as activities that a user within a system may perform to trigger an award of a badge to the user profile, the badge indicating, e.g., that the individual owning the profile has a skill, made an achievement, etc. The award, when triggered, will be published to the designated user profile.

Other systems, methods, features, and advantages of the disclosure will be, or will become, apparent upon examination of the following figures and detailed description. It is intended that all such additional systems, methods, features and advantages be included within this description, be within the scope of the invention, and be protected by the following claims.

BRIEF DESCRIPTION OF THE DRAWINGS

The following description of the drawings and the various system, method, and apparatus is not intended to limit the inventive system, methods and apparatus disclosed herein to one embodiment, but rather to enable any person skilled in the art of project management and/or software development to make and use the inventive system, method and apparatus.

Figure 1:
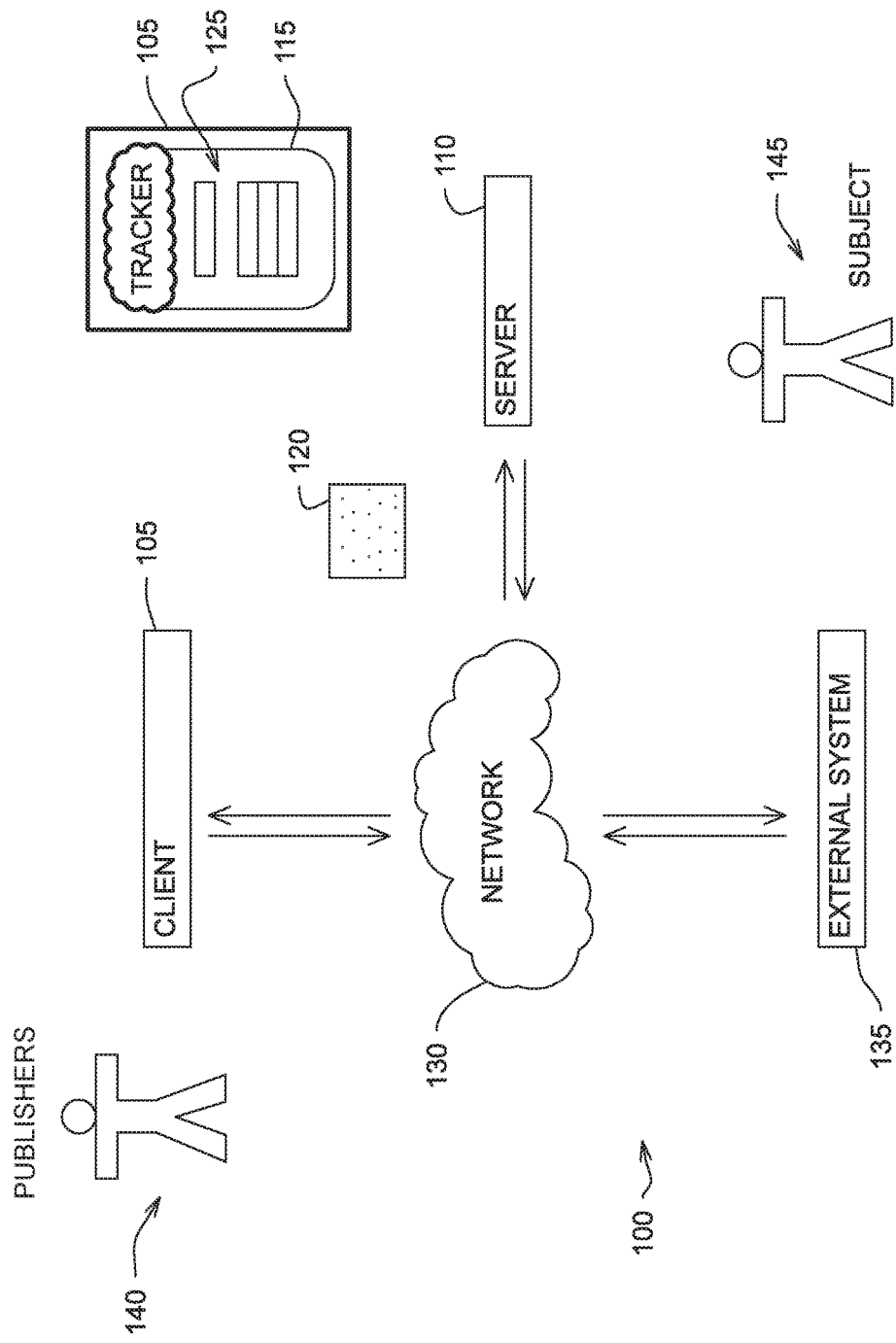
FIG. 1 is a diagram of an exemplary environment in which system, method, and software product may be implemented.

All figures from app Ser. No. 61/816,675 are incorporated herein by reference in their entirety.

DETAILED DESCRIPTION

Individuals and organizations increasingly rely upon electronic profiles, which can be accessed and searched, on the world wide web. For example, profile resources such as LINKEDIN and FACEBOOK have become almost mandatory for professionals engaging in commerce. They have also become one of the predominant methods of communicating information among peers, coworkers, potential clients, potential employers, and otherwise. A drawback of the currently existing profile systems is that they must be manually updated and maintained. An individual or organization using profile services must self-populate the information contained therein. For example, each individual must enter information about their education, their job history, their skills, publications and speeches, their interests, etc. They must also frequently update the profiles to reflect their continued activities, achievements, and movements. Entire businesses have sprung up to assist with this function, e.g., organizations and individuals hire staff to track their activities and manually enter and update their web profiles.

It is hereto unknown for a business system to be able to gamify its internal systems using an external system, method, or software product. Currently, a business desiring to add gamified applications to its internal business system hires a contractor to tailor, e.g., a reward system, to its existing business system. The resulting business system is insular to the company. Resulting awards are generated only in an internal profile system. The user for whom the profile is created cannot take the profile (which may display the user's skills and abilities) with it when it changes jobs and cannot use the profile to demonstrate skills to others, e.g., with social or business networking community.

Unlike known profile platforms, we disclose a system, method, and software product (referred to herein for convenience as the "Tracker") that allows third parties, including third party applications, to update the user profile of another in real time. A simplified example follows:

Bill Jones works for Company. Company uses Tracker to manage project teams, set project management deadlines, and determine progress on projects. Bill's project manager, via Tracker, invites Bill into a project team and assigns tasks to Bill. When Bill is invited into the project, if Bill does not already have a profile with Tracker, Tracker creates a profile for Bill, e.g., associated with the email address he uses within Company. As Bill works within the Tracker system, (or within a system in communication with Tracker) the Tracker automatically updates Bill's profile to display the various skills Bill is using, Bill's progress, and Bill's achievements. The Tracker may report Bill's activities, skills, and achievements by applying icons to Bill's profile. In one example, the Tracker may apply badges to Bill's profile to demonstrate Bill's skills; the Tracker may apply certificates to Bill's profile to represent Bill's participation in continuing education events. For example, when Bill completes a task that requires Ruby programming, the Tracker may add a "Ruby" badge to Bill's profile. If Bill routinely works late on projects, the Tracker may communicate that Bill takes ownership of assigned projects by adding a "Dedication" badge to Bill's profile.

Outside of his work for Company, Bill may perform volunteer work for an organization ("Organization"). Like Company, Organization may use Tracker to manage its missions and projects. Organization, e.g., via Tracker, may invite Bill into a project, such as a charity home building project. Organization may find Bill's profile on Tracker, or Tracker may create (or prompt Bill to create) a profile for Bill if one does not exist. Organization may assign Bill tasks within the project. As the tasks are completed, the Tracker may communicate real time skills Bill is using by adding icons to Bill's Tracker profile.

The Tracker will recognize if Bill already has a profile within the Tracker system, and aggregate the skills from both the Organization and the Company into one profile. In this case, the Organization may add an icon, such as a badge for the skill of "carpentry." Organization may add certificates representing Bill's participation in training exercises such as "Organizational Development" or "Building Communication Skills."

Outside of both of these communities, Bill may be a member of a health and wellness club ("Club"). Club may use Tracker to assist members in setting goals and analyzing their progress toward those goals. Club may also use Tracker collected information to make marketing and business decisions. Tracker may automatically update Bill's profile (e.g., via publishing a badge to the profile) to communicate that Bill has attained a particular golf handicap, has achieved a level of proficiency with swimming, or has achieved a black belt in a martial art. Tracker aggregates the information from the Company, the Organization, and the Club into one profile that Bill can use to communicate his skills and achievements. The information is automatically entered as Bill performs the activities of his life.

The system, method, and software product aggregates the information from multiple sources, such as Club, Organization, and Company, into one location so that Bill can carry the profile with him when he changes employers, clubs, or organizations. The profile may be tailorable by both Bill and the third parties who are delivering the information to Bill's profile. For example, Bill may elect to hide the information published by Club from his employer, Company. Company may elect to hide badges related to, e.g., Bill's sales performance, from individuals outside of the Company, and similar. This can be further extended to flushing out Bill's education, certifications, and otherwise. For example, educational institutions using Tracker may track Bill's progress through the education process and automatically communicate Bill's educational achievements to the Tracker (e.g., via a badge) for display on Bill's profile. This may lead to more accurate information because it is real time and it does not rely solely on self-entry but on actual activities.

The above example of the system, method, and software product and the designation "Tracker" is provided to introduce the environment in which the disclosure operates in a simplified form. The summary is not intended to identify key features or essential features of the claimed subject matter.

Unless stated to the contrary, for the purpose of the present disclosure the following terms shall have the following definitions:

A reference to "another variation" in describing an example does not imply that the referenced variation is mutually exclusive with another variation unless expressly specified.

The terms "a," "an" and "the" mean "one or more," unless expressly specified otherwise.

The phrase "at least one of" when modifying a plurality of things (such as an enumerate list of things) means any combination of one or more of those things, unless expressly specified otherwise.

The term "represent" and like terms are not exclusive, unless expressly specified otherwise. For example, the term "represents" does not mean "represents only," unless expressly specified. In other words, the phrase "the data represents X," describes both "the data represents X" and "the data represents X and the data also represents something else."

The term "based upon" or "based on" or other similar variants does not mean "based only on" and rather expresses "based at least on."

The term "e.g." and like terms means "for example, but not limited to" and thus does not limit the term or phrase it explains.

The term "determining" and grammatical variants thereof (e.g., determining whether a subject performed an action) is used in a broad sense. The term "determining" encompasses a wide variety of actions and therefore "determining" can include calculating, computing, processing, deriving, investigating, looking up (for example, looking up in a table, a database, or another data structure), ascertaining, and the like. Also, "determining" can include receiving (e.g., receiving information), accessing (e.g., accessing data in a memory) and the like. Determining may also include resolving, selecting, choosing, establishing, etc.

The term "herein" means "in this patent application including anything which may be incorporated by reference," unless otherwise specified.

The various processes described herein may be implemented by, e.g., a programmed general purpose computer and/or computing device. For example, a processor, (e.g., one or more microprocessors, one or more microcontrollers, on or more digital signal processors, and/or otherwise) may receive instructions (e.g., from a memory or like device), and execute those instructions, thereby performing one or more processes in the instructions.

A processor may mean, for example but not limited to, one or more microprocessors, central processing units (CPUs), computing devices, microcontrollers, digital signal processors, or like devices, and/or any combination thereof. The apparatus or device that implements a process or method described herein, may include, for example, any input devices and/or output devices appropriate to perform the process and/or method. Further, programs that implement processes and/or methods (as well as other types of data) may be stored and transmitted using a variety of media (e.g., computer readable media) and in a variety of ways. Additionally or alternatively, variation combinations of hardware and/or software may be used instead of software only. For example, hard-wired circuitry or custom hardware may be used in place of, or in combination with, some or all of the software instructions that, for example, have the ability to implement the processes of variations described herein.

We refer for simplicity to "storage device" (e.g., FIG. 2, 250) as a short hand for computer-readable medium. Computer-readable medium (and thus storage device 250) may refer to any medium that participates in providing data (e.g., instructions, data structures) which may be read by a computer, a processor, or other similar device. Such a medium may take many forms, including but not limited to, non-volatile media, volatile media, and transmission media. Non-volatile media may include, for example but not limited to, optical or magnetic disks and/or other persistent memory. Volatile media may include dynamic random access memory (DRAM). Computer readable media may also include, for example, non-transitory computer-readable medium, floppy disks, flexible disks, hard disks, magnetic tape, any other magnetic media, CD-ROM, DVD, any other optical medium, and any other memory chip or cartridge, or any other medium from which a computer can read.

Various forms of computer readable media may be involved in carrying data (e.g., sequences of instructions) to a processor. For example, data may be delivered from RAM to a processor, carried over a wireless transmission medium, formatted and/or transmitted according to one or more formats, standards, and/or protocols, such as but not limited to Ethernet, SAP, ATP, BLUETOOTH, TCP/IP, TOMA, CDMA, and/or 3G; and/or encrypted to ensure privacy or prevent fraud in any known way.

Various steps in a process do not indicate that all of the described steps are required or that the steps are required to be performed in the order described. Just as the description of various steps in a process does not indicate that all of the steps are required, all of the steps do not necessarily have to be performed on the same computer/computing device.

Where databases are described, it will be understood that alternative database structures to those described may be readily employed and that other memory structures other than databases may be readily employed. Any illustrations or descriptions of any sample databases represented herein are illustrative arrangements. Any number of other arrangements may be employed. Similarly, any illustrated entries of the databases represent exemplary information only—the number and content of entries may be different from those described herein. Further, the database may have any format including relational databases, object-based models, and/or distributed databases. In addition, databases may be stored locally or remotely from any device(s) which access data in the database.

The system, method and software product may be configured to work in various network environments, including but not limited to a computer that is in communication (e.g., via a communications network) with one or more devices. The computer may communicate with the devices directly or indirectly, via any wired or wireless medium. Each of the devices may themselves comprise computers or other computing devices that may or may not be adapted to communicate with the computer. Any number and type of devices may be in communication with the computer.

Interface may be any suitable type of network interface and/or local interface (e.g., an interface for programming and information retrieval), such as but not limited to any of the following: a keyboard, mouse and monitor; a mobile phone or smart phone; a tablet; a laptop; or otherwise.

FIG. 1 is a diagram of an exemplary environment 100 in which system, method, and software product may be implemented. Environment 100 may include one or more clients 105 connected to one or more servers 110 via a network 130. One client 105 and one server (e.g., server 110) is shown for simplicity. In practice, there may be more or fewer clients 105 and servers 110. Also, in some instances, a client 105 may perform a function of a server 110 and a server 110 may perform a function of a client 105. The environment 100 may also include users. Users may include organizations, companies, educational institutions, individuals, or other entities benefiting from performance tracking and/or capable of performance reporting.

Clients 105 may be a device, such as a personal computer, a wireless telephone, a personal digital assistant, a tablet computing device, a smart phone, a lap top, or another type of computation or communication device, a thread or process running on one of these devices, and/or an object executed by one of these devices. In one implementation, a client 105 may include a user interface (e.g., via a browser 115) that permits access to the functionality of the disclosed system and method. (For example, a user interface that presents through a browser 115, e.g., a user profile, a dashboard for creating and conditioning awards for loading onto proximity devices, applications for removing, creating, accepting, editing awards.) Client 105 may also include software such as a plug-in, an applet, and application, or other executable object or process, that may operate in conjunction with (or be integrated into) the user interface to obtain and display skills tracking information. Client 105 may obtain the software from the server 110 or from a third party, such as a third party server, disk, tape, network, CD-ROM, etc. Alternatively, the software may be pre-installed on client 105.

The environment may also include users. In this example, the users are identified as publisher 140 and subjects 145. Subjects 145 may broadly describe any type of individual capable of performing actions, e.g., an employee, an employment candidate, a team member, a team candidate, a student, a test subject, a participant. A publisher 140 broadly describes any type of individual capable of creating and entering a skill profile into the skill tracking system.

The environment may optionally include a proximity device 120. The proximity device 120 may be, for example but not limited to, a near field communication device ("NFC"), a Quick Response ("QR") tag, or similar. The client 105 may be enabled with a proximity device 120, for example but not limited to, enabled to read a proximity device 120, to program a proximity device 120 or otherwise interact with (send and receive information from and to) a proximity device 120.

Figure 2:
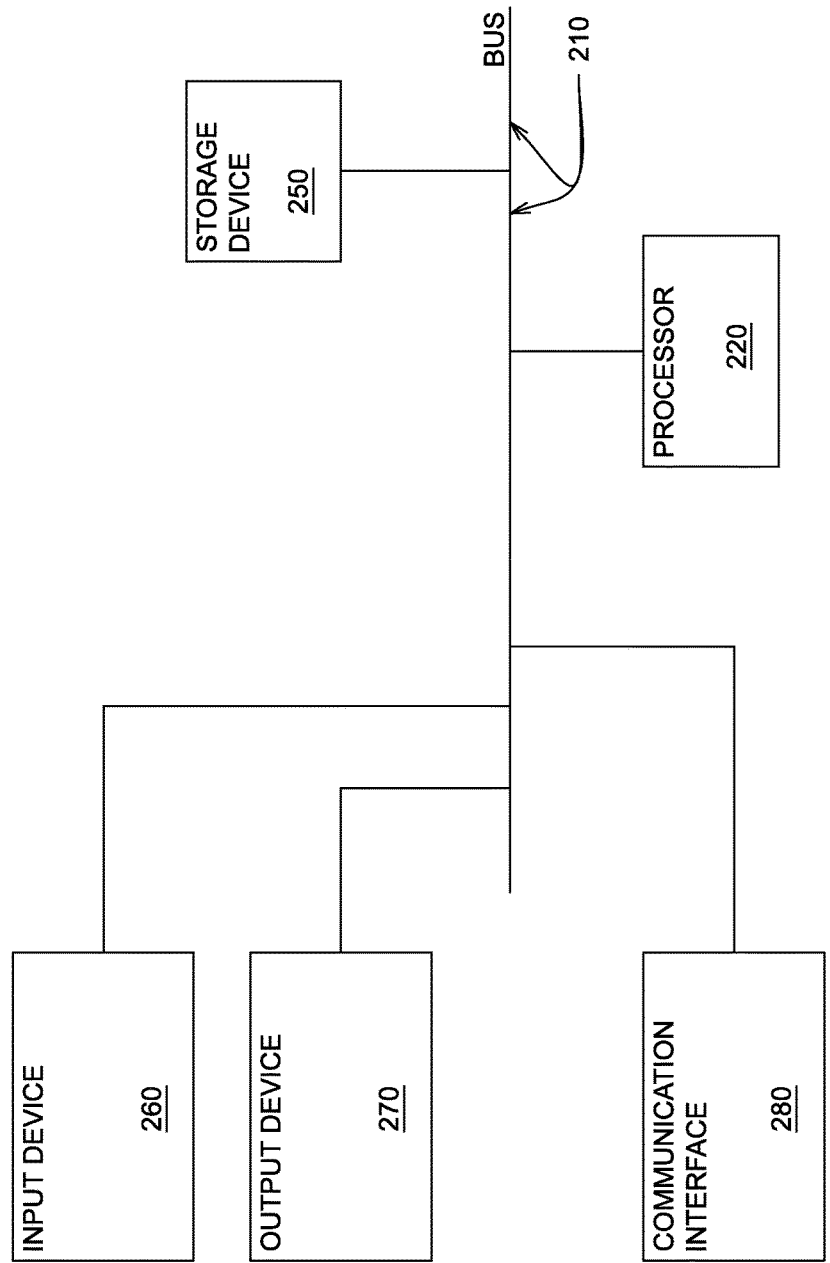
FIG. 2 is a diagram of exemplary components of a client or server of FIG. 1.

Storage device(s) FIG. 2, 250 may store or maintain the data, instructions, or databases that may be used in or developed by the disclosed system and method. While server 110 and storage device 250 are shown as separate entities, it may be possible for one or more of server 110 and storage device 250 to perform one or more of the functions of another one or more of server 110 and storage device 250. For example, it may be possible for server 110 and storage device 250 to be implemented as a single server 110. It may also be possible for a single one of server 110 and storage device 250 to be implemented as two or more separate (and possibly distributed) devices.

Network 130 may include any type of network, such as a local area network (LAN), a wide area network (WAN), a telephone network, a cellular network, an intranet, the Internet, cloud computing, or a combination of networks. Clients 105 and servers 110 may connect to network 130 via wired and/or wireless connections.

FIG. 2 is a diagram of exemplary components of a client or server entity, which may correspond to one or more of clients 105 and/or server 110. As shown in FIG. 2, the client/server entity may include, a processor 220, a storage device 250, an input device 260, an output device 270, and a communication interface 280. In another implementation, client/server entity may include additional, fewer, different, or differently arranged components than are illustrated in FIG. 2.

Bus 210 may include a path that permits communication among the components of the client/server entity. Processor 220 may include a processor, a microprocessor, or processing logic (e.g., an application specific integrated circuit (ASIC) or a field programmable gate array (FPGA)) that may interpret and execute instructions. Input device 260 may include a mechanism that permits an operator to input information to the client/server entity, such as a keyboard, a mouse, a button, a pen, a touch screen, voice recognition and/or biometric mechanisms, etc. Output device 270 may include a mechanism that outputs information to the operator, including a display, a light emitting diode (LED), a speaker, etc. Communication interface 280 may include any transceiver-like mechanism that enables the client and/or server to communicate with other devices and/or systems. For example, communication interface 280 may include mechanisms for communicating with another device or system via a network, such as network 130.

As will be described in detail below, the client 105 and/or server 110 may perform certain operations relating to, for example but not limited to, receiving activity descriptions and parameters, acquiring information about a user's activities, determining whether the user's activities meet the parameters, updating a user's profile with information about the user's skills, activities, achievements, and similar, alternatively or additionally, the client and/or server may generate and communicate to a profile real-time information about a user. The client and/or server entity may perform these operations in response to processor 220 executing software instructions contained in a non-transitory computer-readable medium, such as storage device 250. As discussed above, computer-readable medium may be a logical or physical memory device. A logical memory device may include a space within a single physical memory device or spread across multiple physical memory devices.

The software instructions may be read from another computer-readable medium, such as storage device 250, or from another device via communication interface 280. The software instructions contained in storage device 250 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Figure 3:
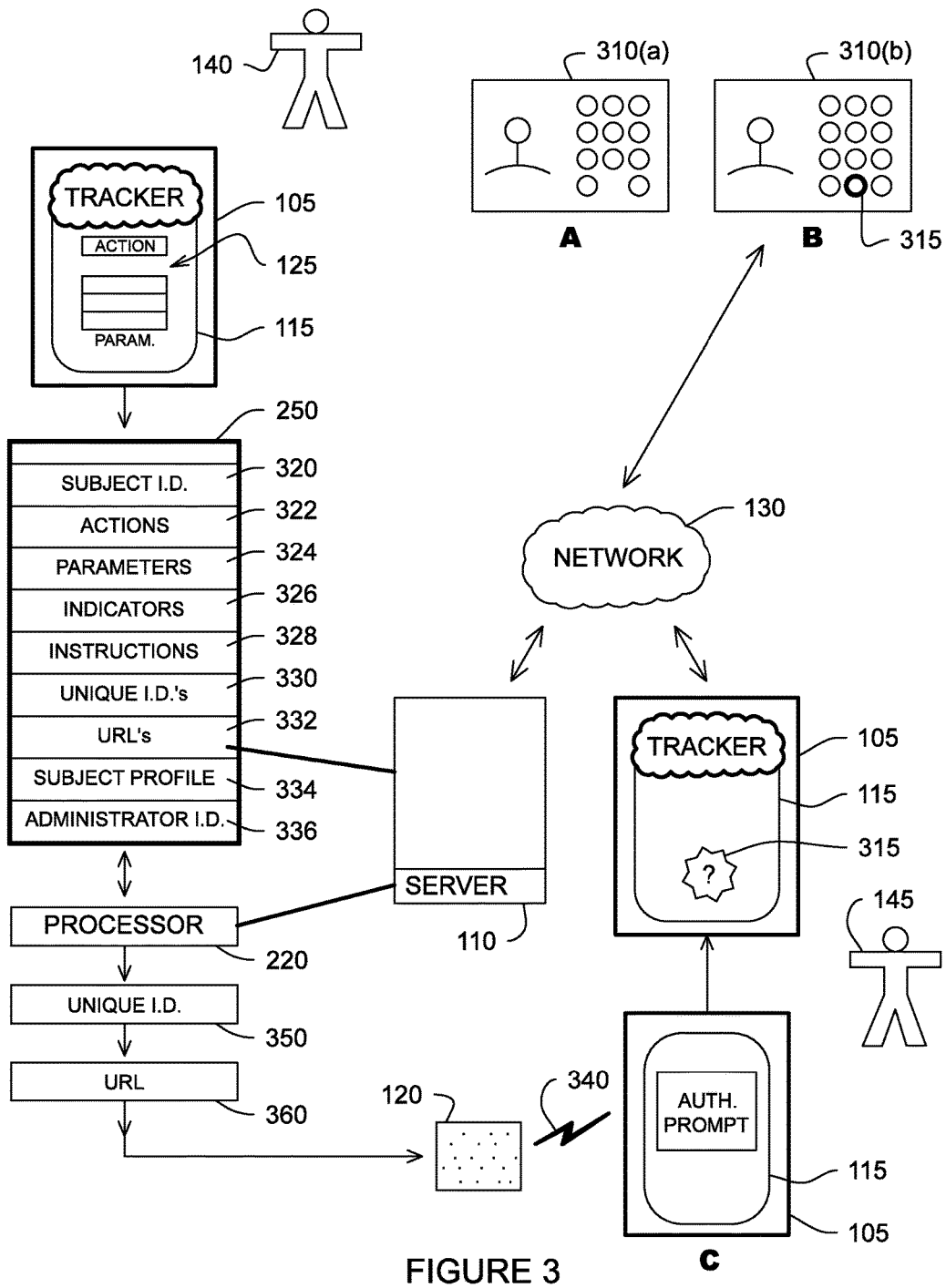
FIG. 3 is a diagram of functional components of the system, method, and software product.
Figure 4:
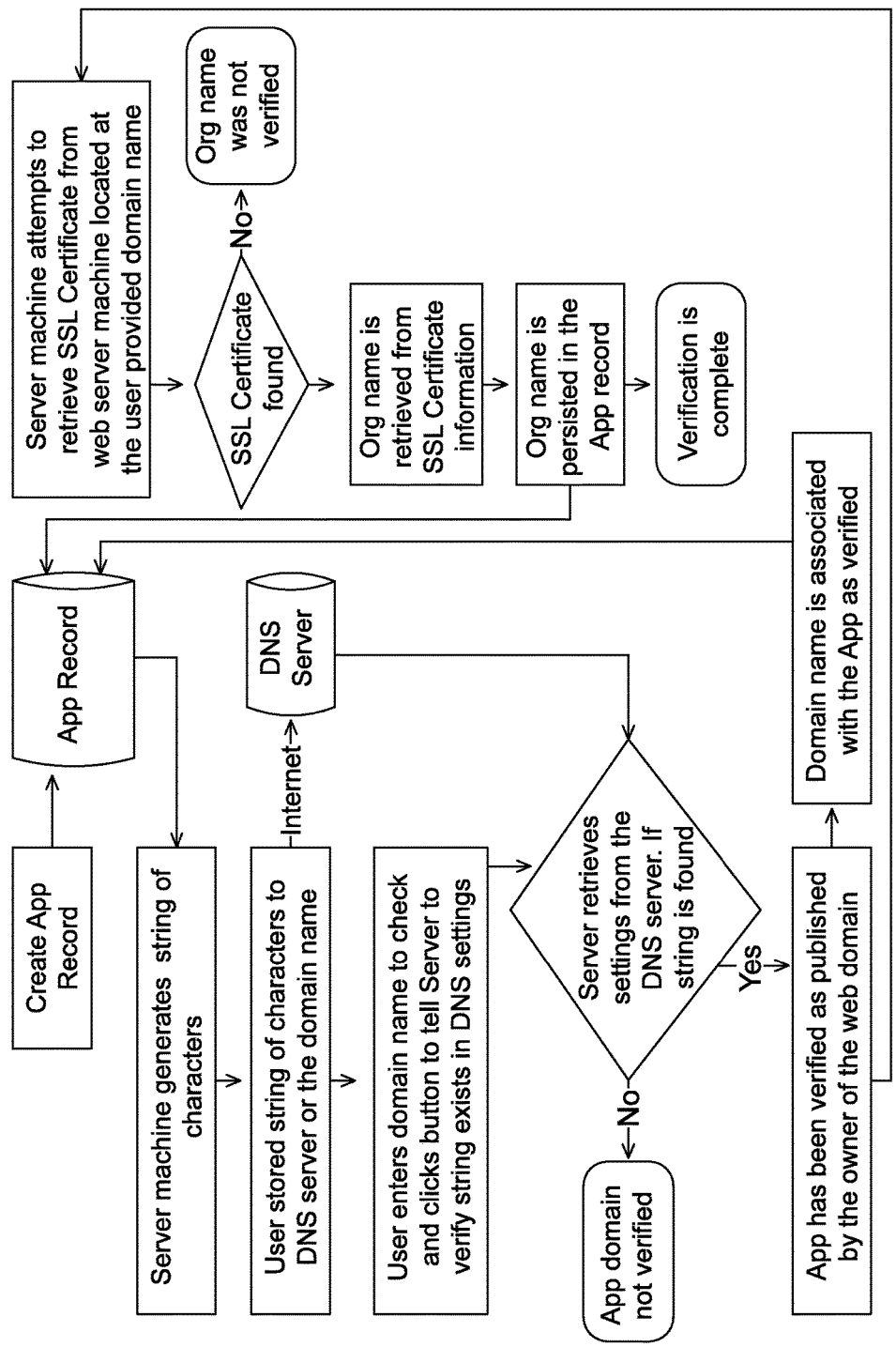
FIG. 4 is a flow chart of a method.
Figure 5:
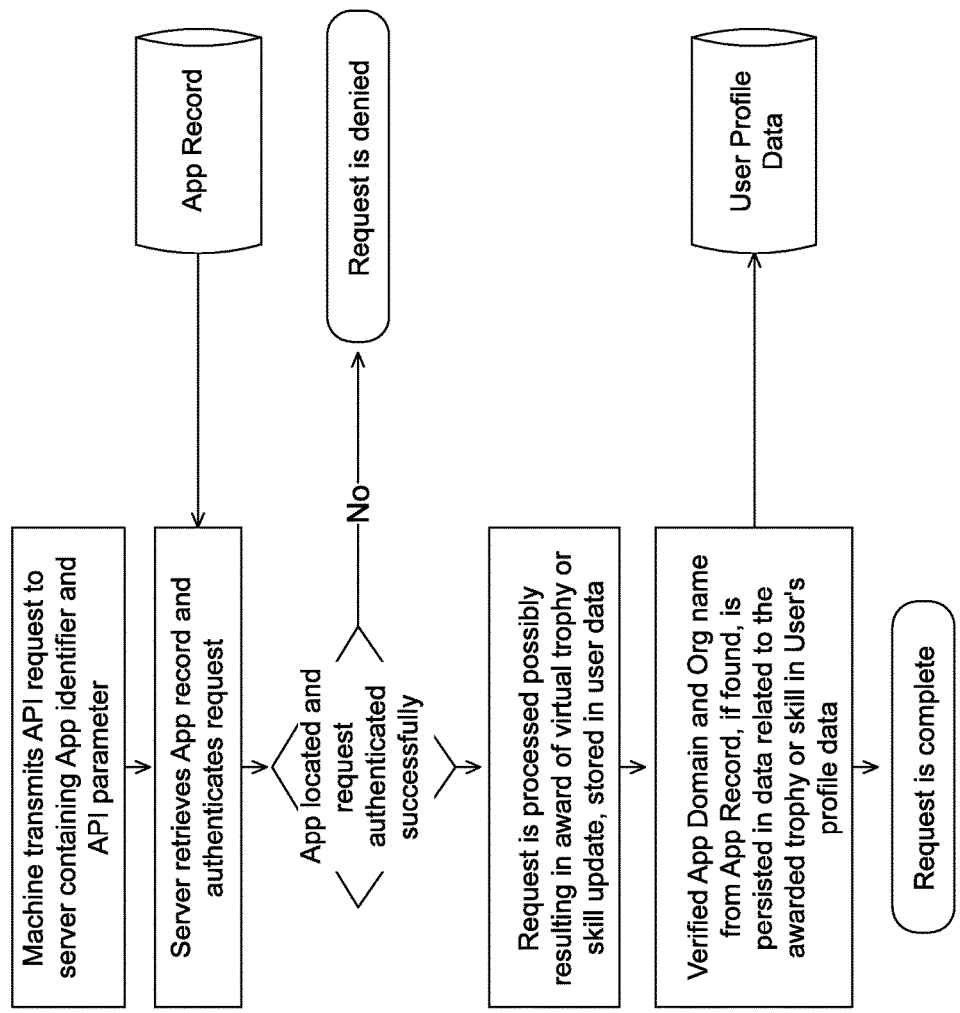
FIG. 5 is a flow chart of a method.
Figure 6:
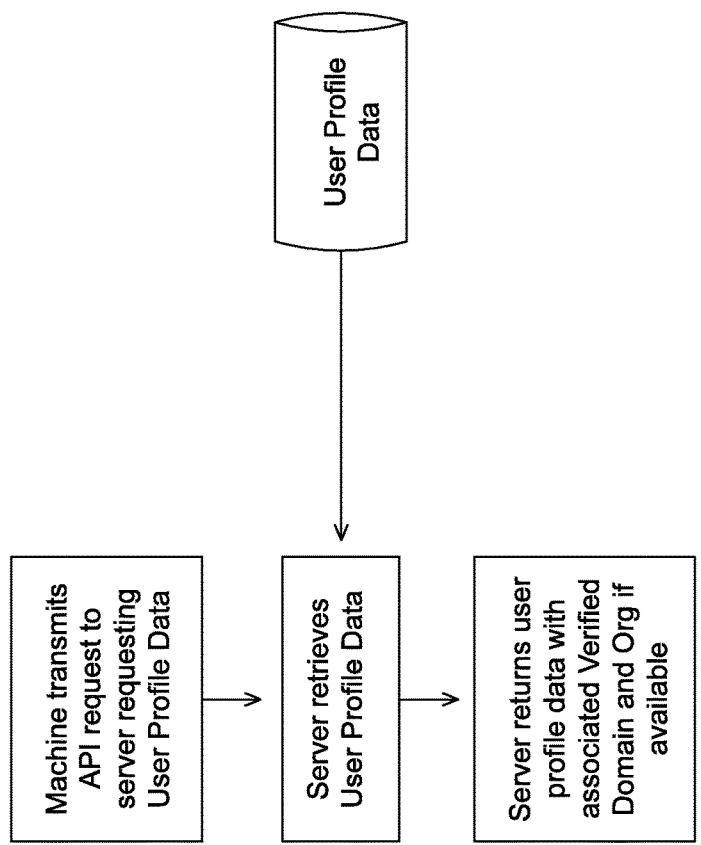
FIG. 6 is a flow chart of a method.
Figure 7:
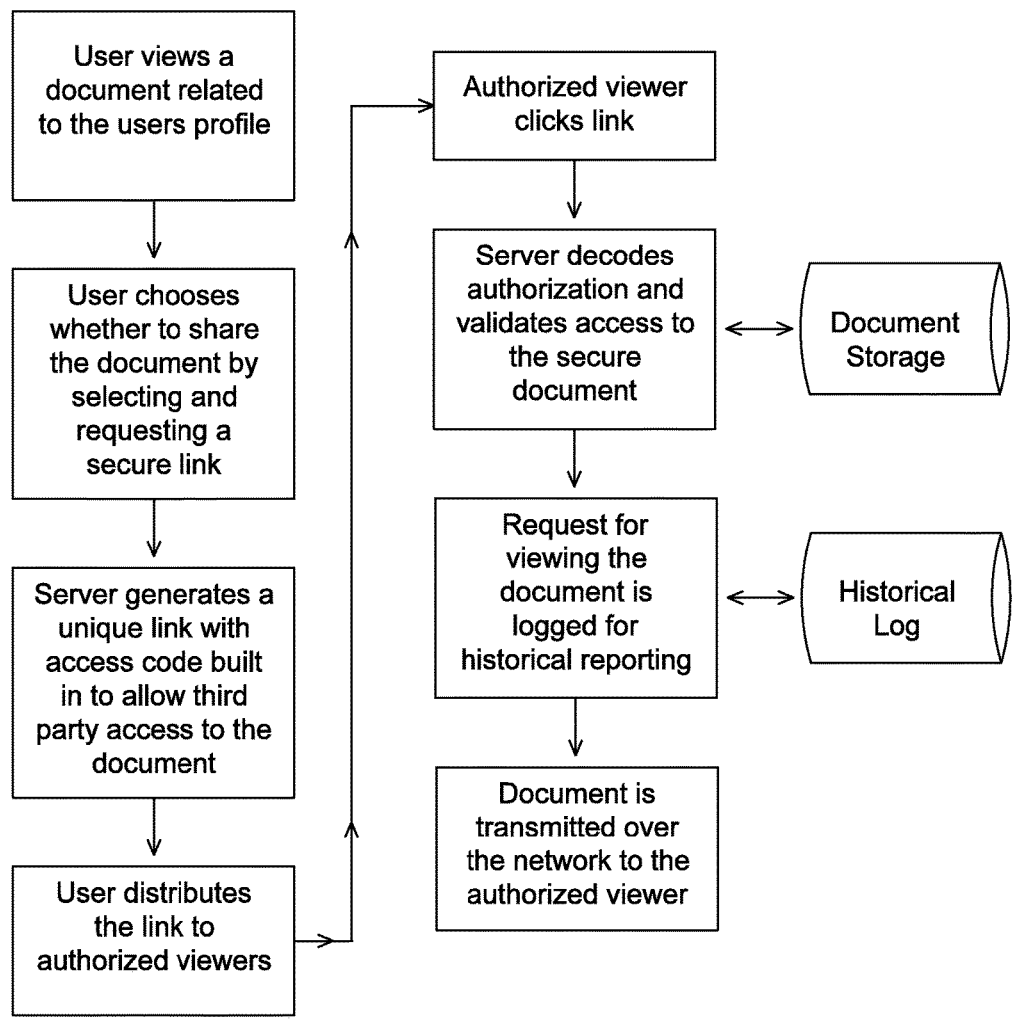
FIG. 7 is a flow chart of a method.
Figure 8:
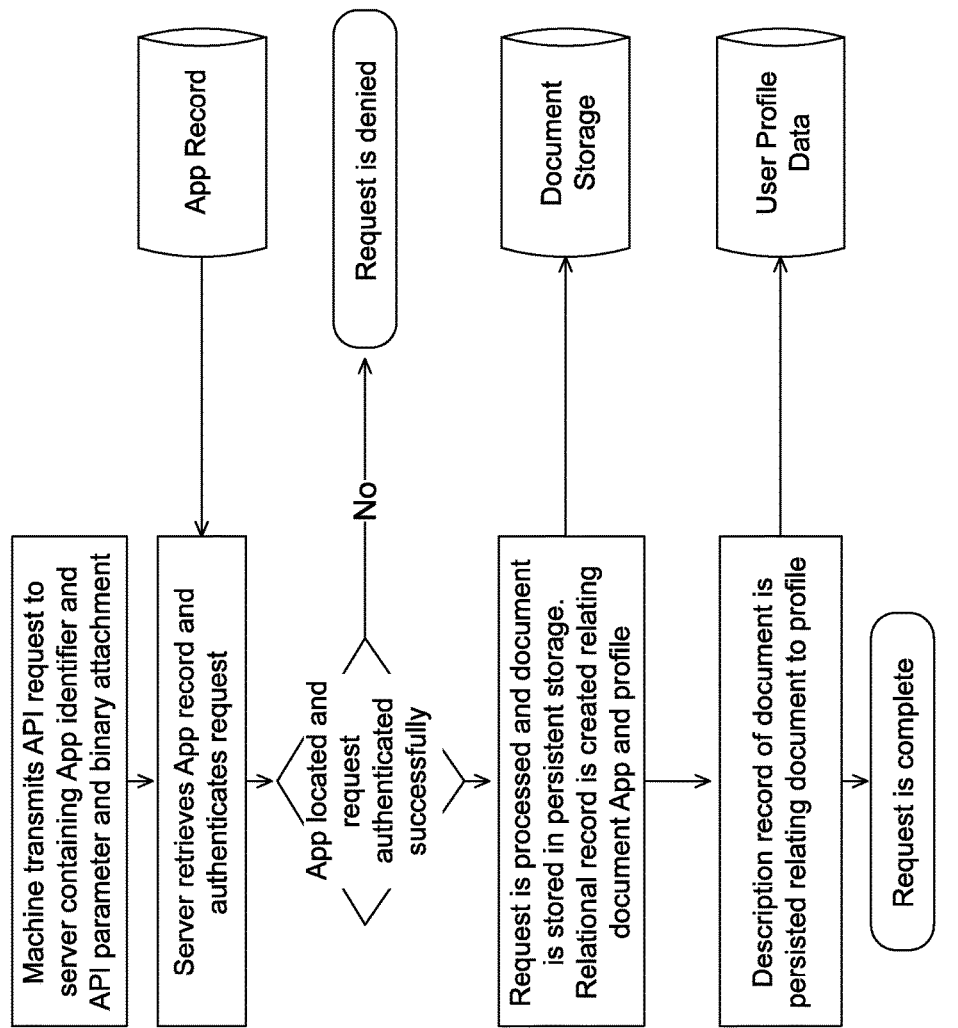
FIG. 8 is a flow chart of a method.
Figure 9:
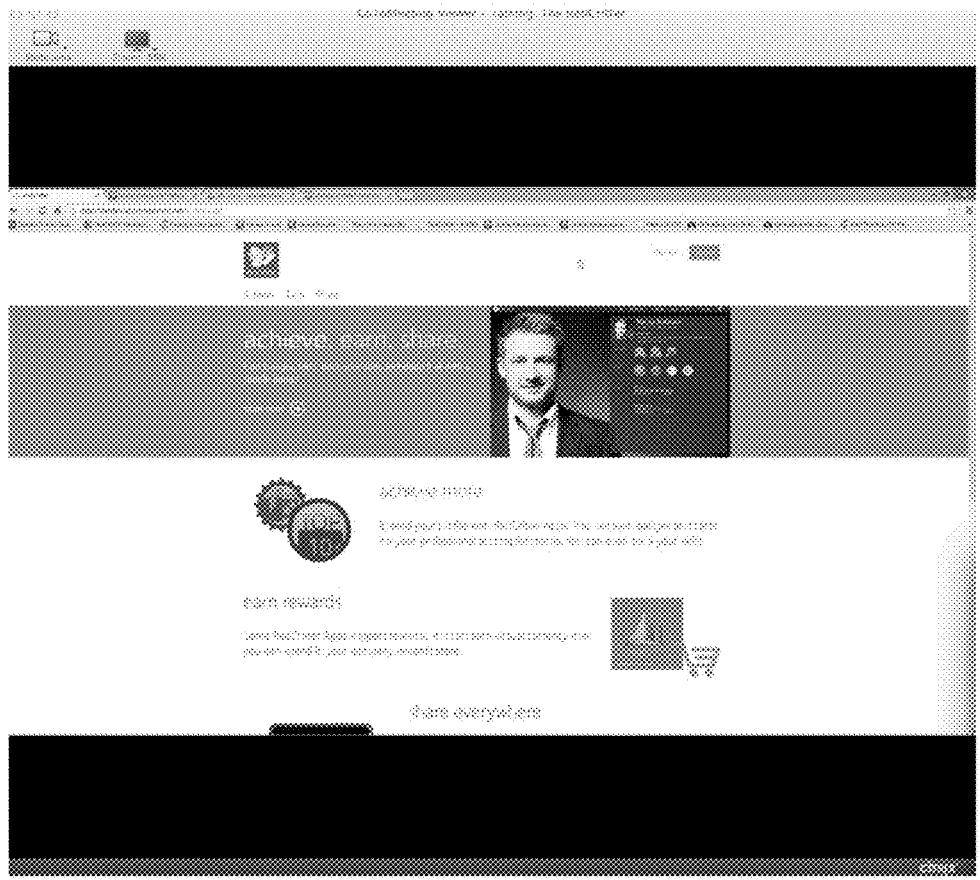
FIG. 9 is an exemplary screen shot from a variation of the software product.
Figure 10:
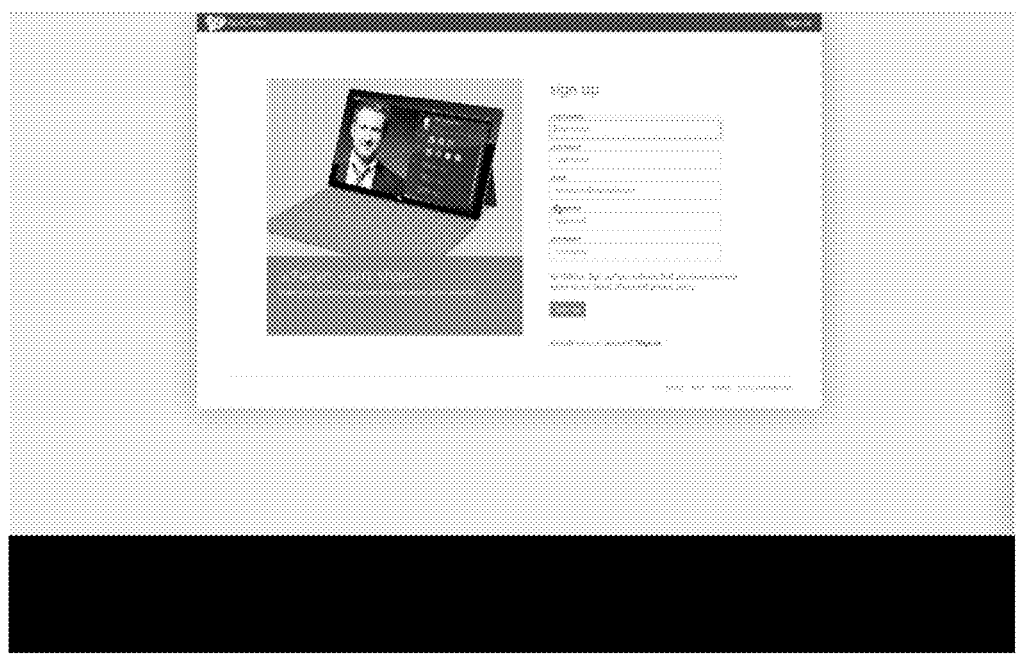
FIG. 10 is a screen shot demonstrating an exemplary prompt.
Figure 11:
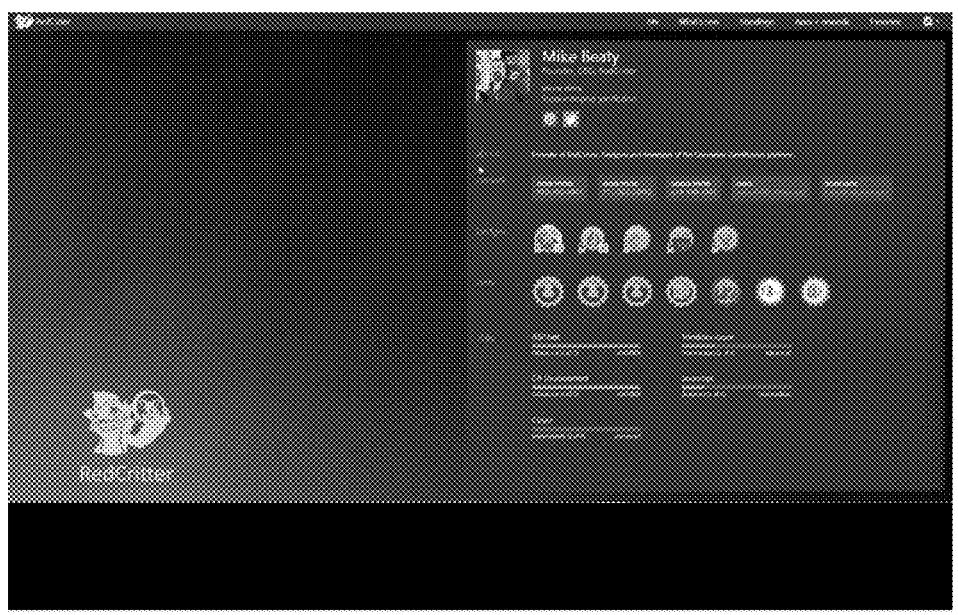
FIG. 11 is a screen shot of an exemplary subject profile.
Figure 12:
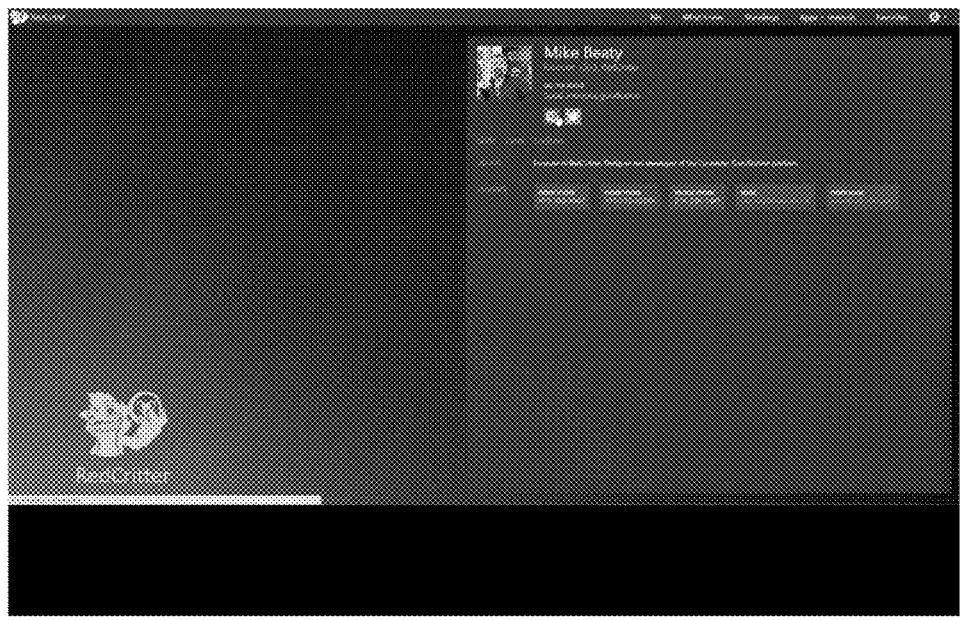
FIG. 12 is a screen shot of a second exemplary subject profile view.
Figure 13:
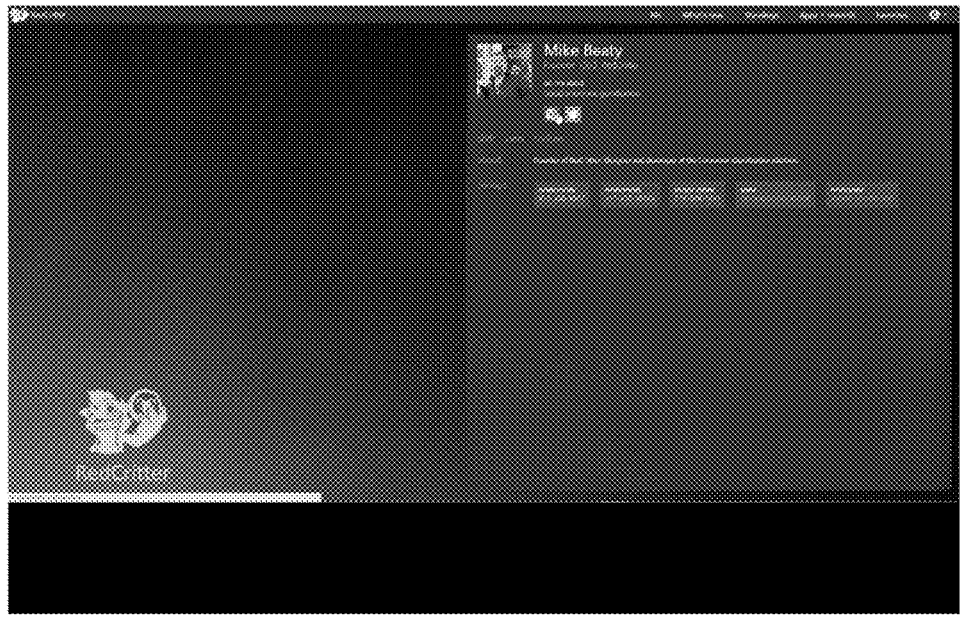
FIG. 13 is a screen shot of a third exemplary subject profile view.
Figure 14:
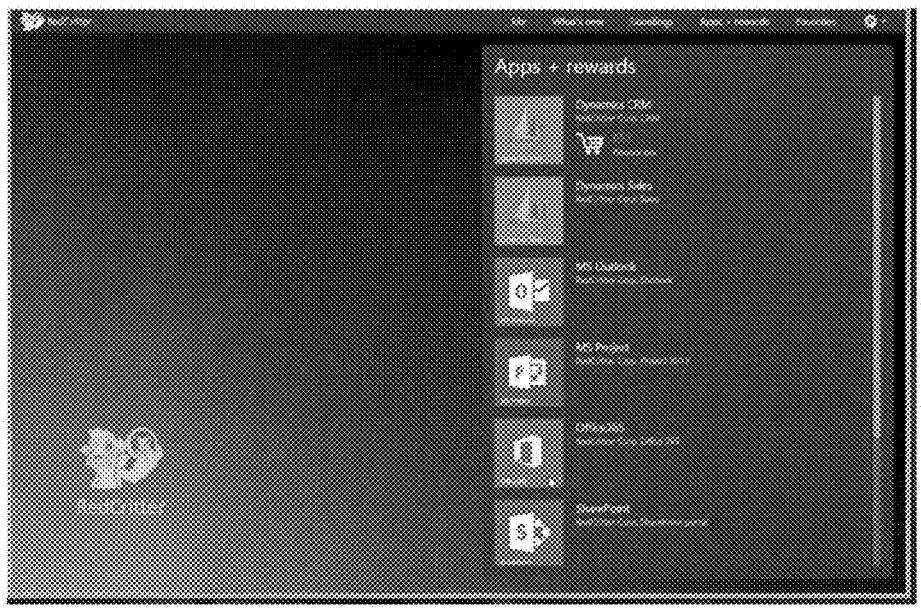
FIG. 14 is an exemplary screen shot.
Figure 15:
FIG. 15 is an exemplary screen shot from an exemplary subject profile.
Figure 16:
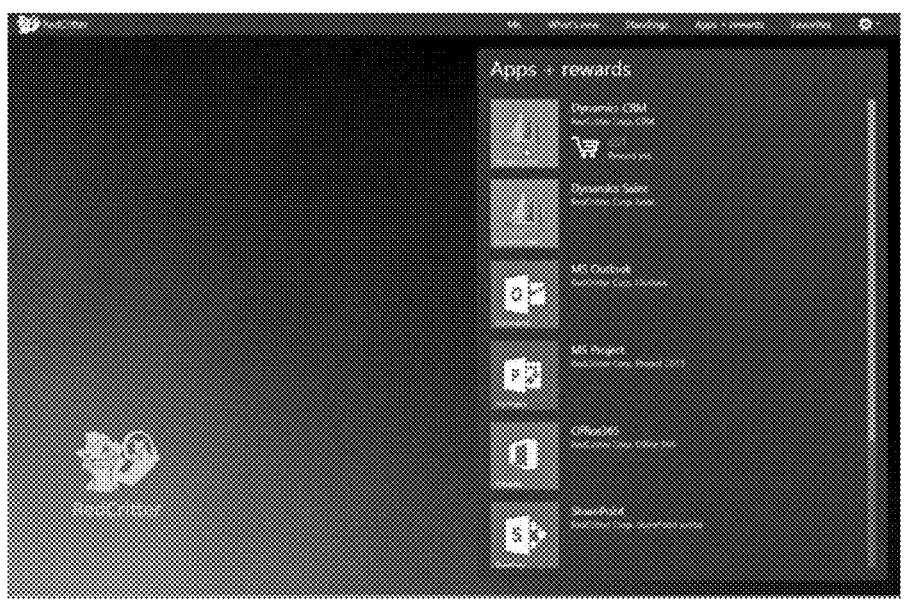
FIG. 16 is an exemplary screen shot.
Figure 17:
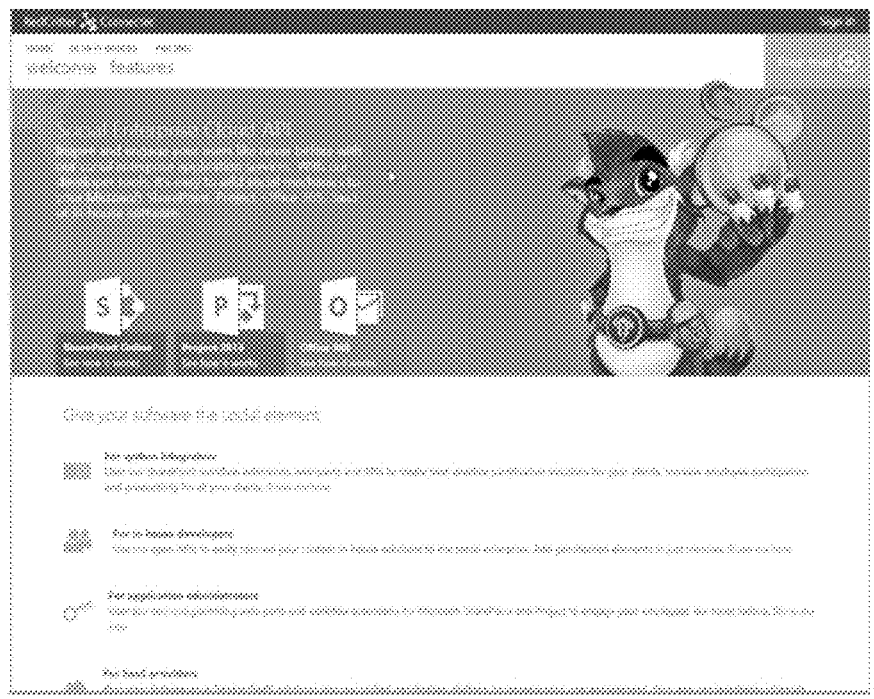
FIG. 17 is an exemplary screen shot.
Figure 18:
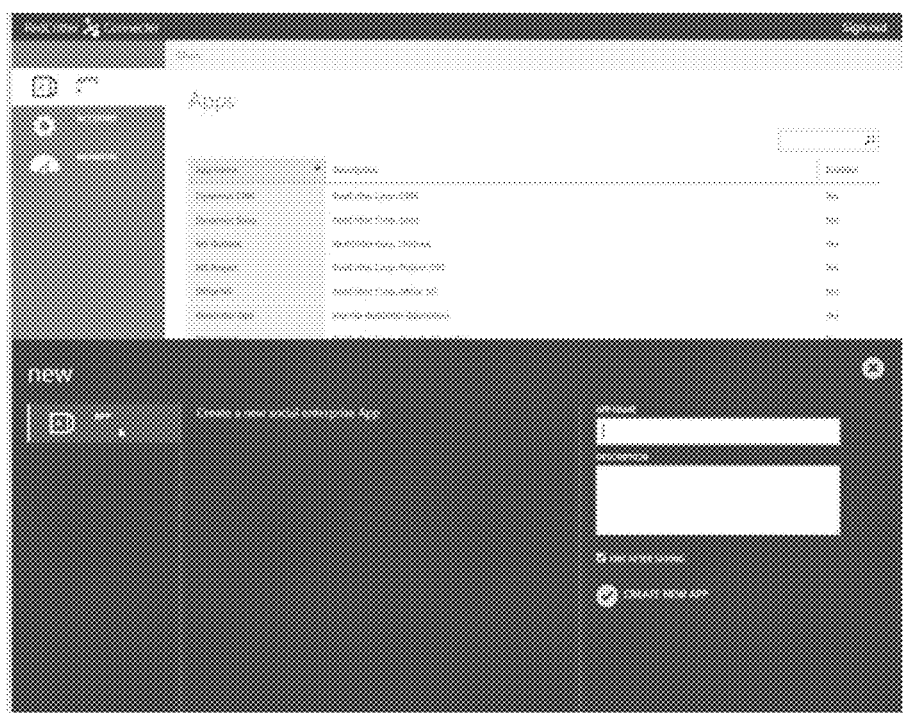
FIG. 18 is an exemplary screen shot of an application creation dashboard.
Figure 19:
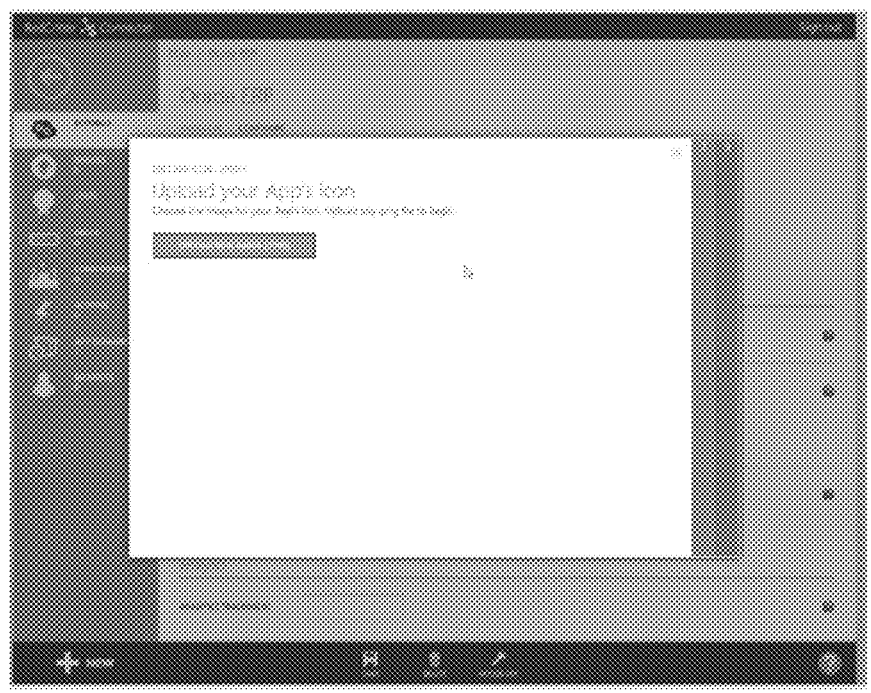
FIG. 19 is an exemplary screen shot of an application creation dashboard.
Figure 20:
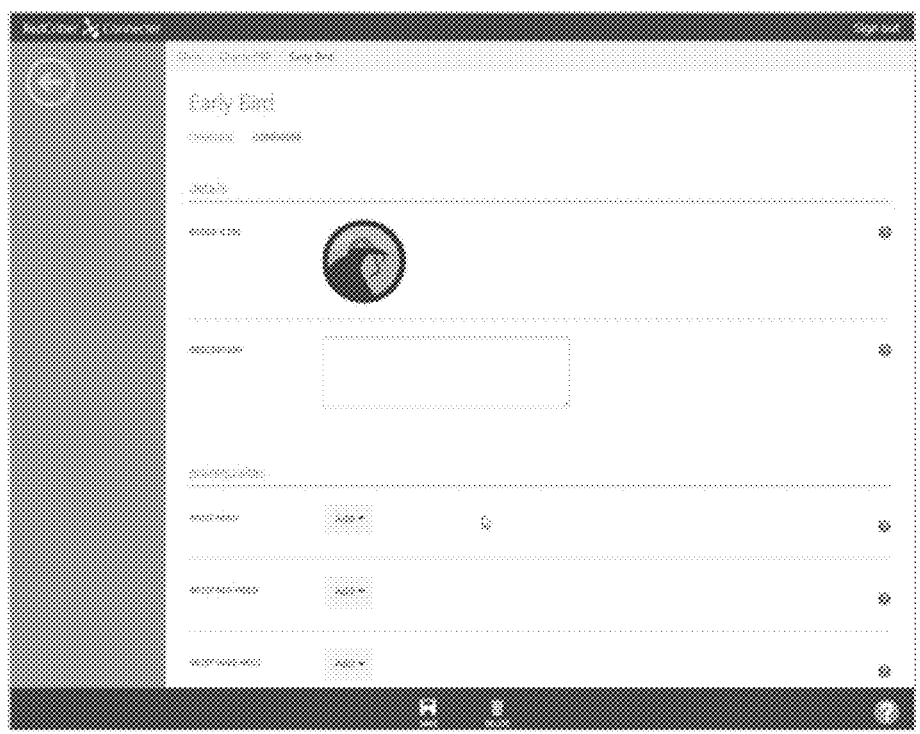
FIG. 20 is an exemplary screen shot of an application creation dashboard.
Figure 21:
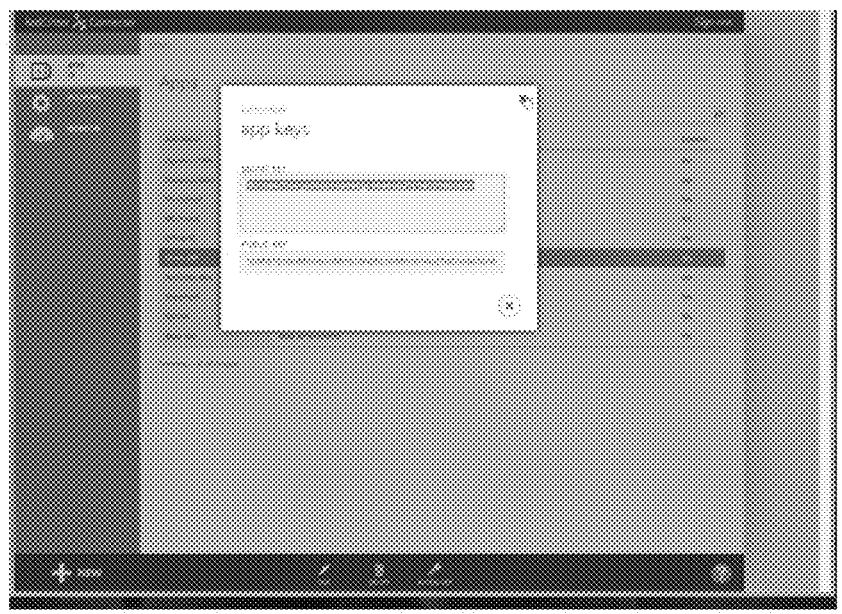
FIG. 21 is an exemplary screen shot of an exemplary application key.
Figure 22:
FIG. 22 is an exemplary code.
Figure 23:
FIG. 23 is a screen shot of exemplary code.
Figure 24:
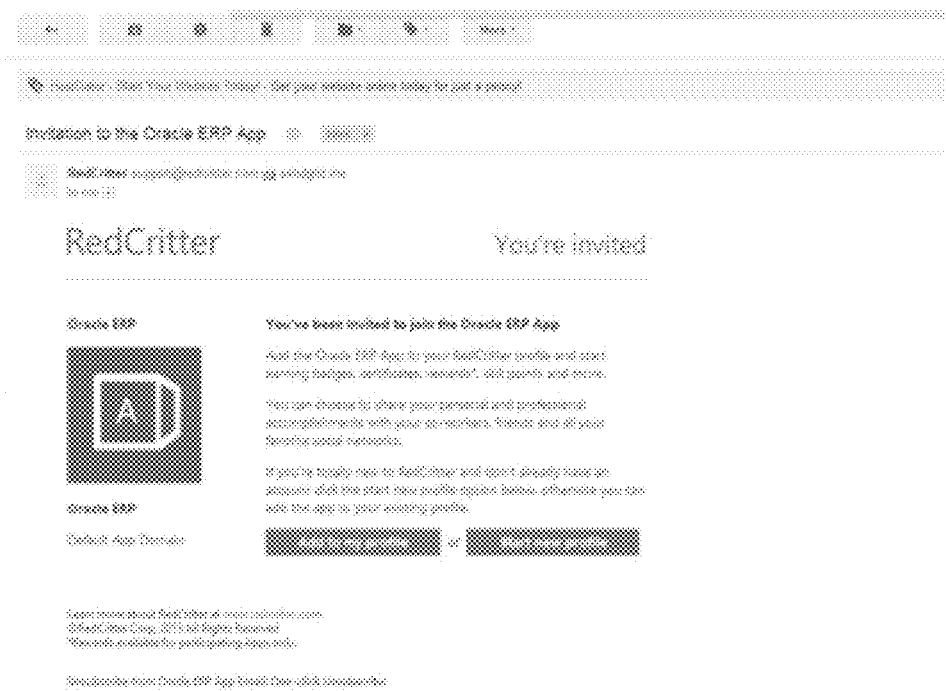
FIG. 24 is a screen shot of an exemplary invitation prompt.
Figure 25:
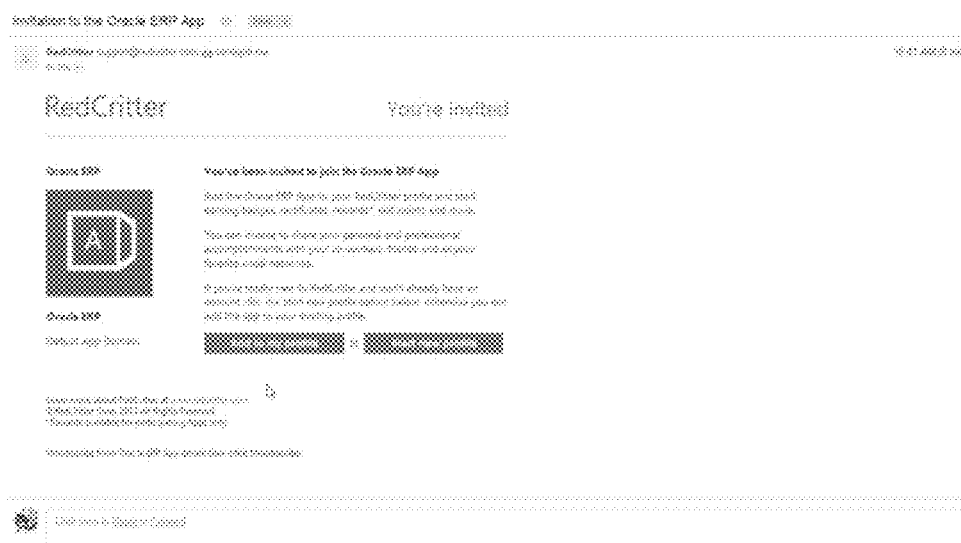
FIG. 25 is a screen shot of an exemplary invitation prompt.
Figure 26:
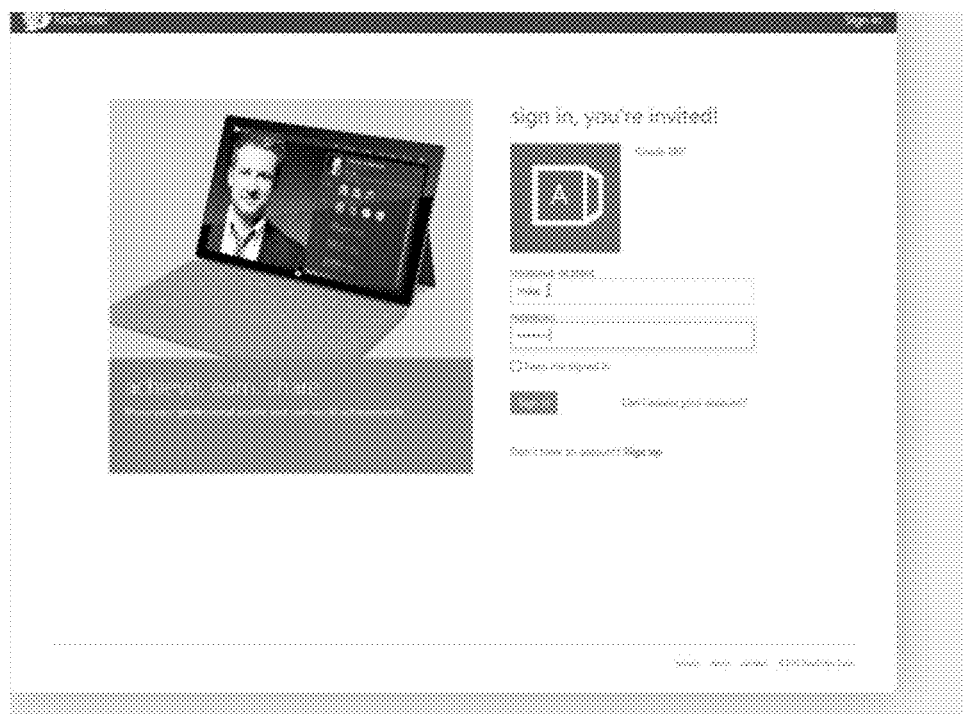
FIG. 26 is a screen shot of an exemplary invitation log in prompt.
Figure 27:
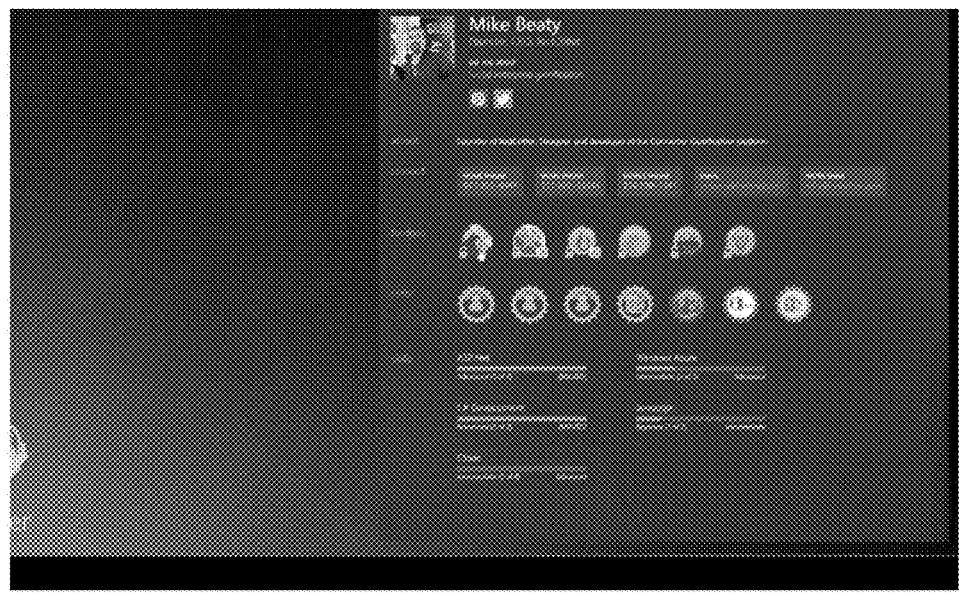
FIG. 27 is a screen shot of an exemplary subject profile.
Figure 28:
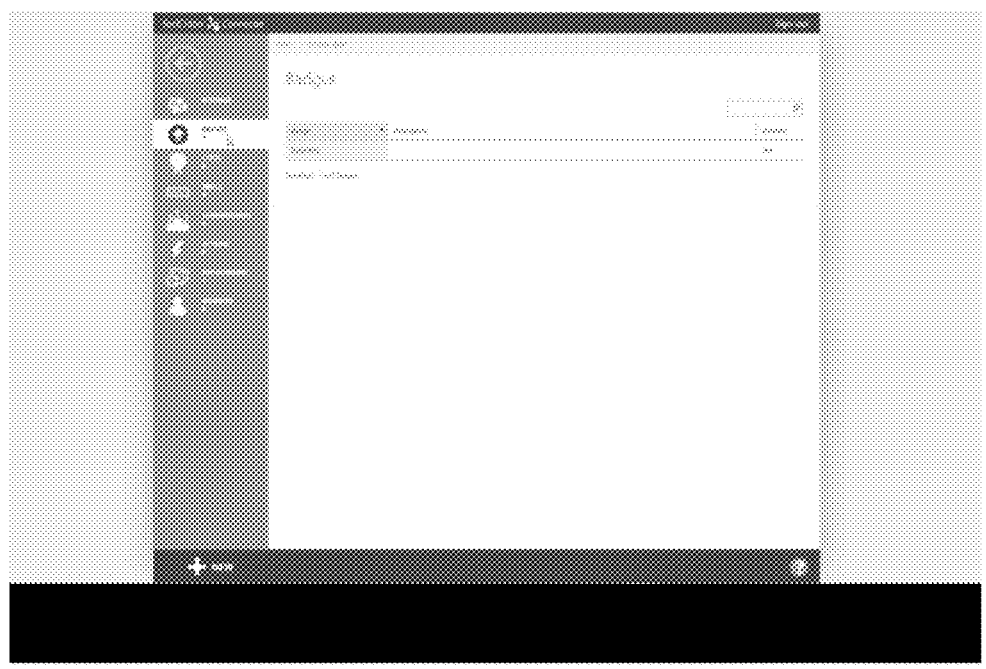
FIG. 28 is a screen shot of an exemplary badge dashboard.
Figure 29:
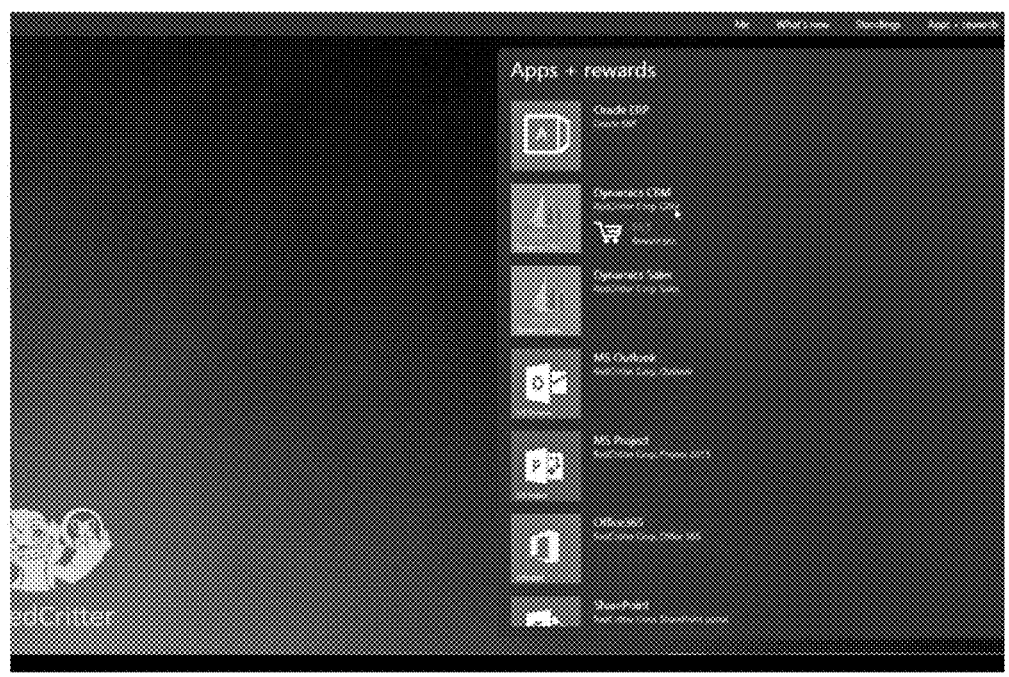
FIG. 29 is an exemplary screen shot.
Figure 30:
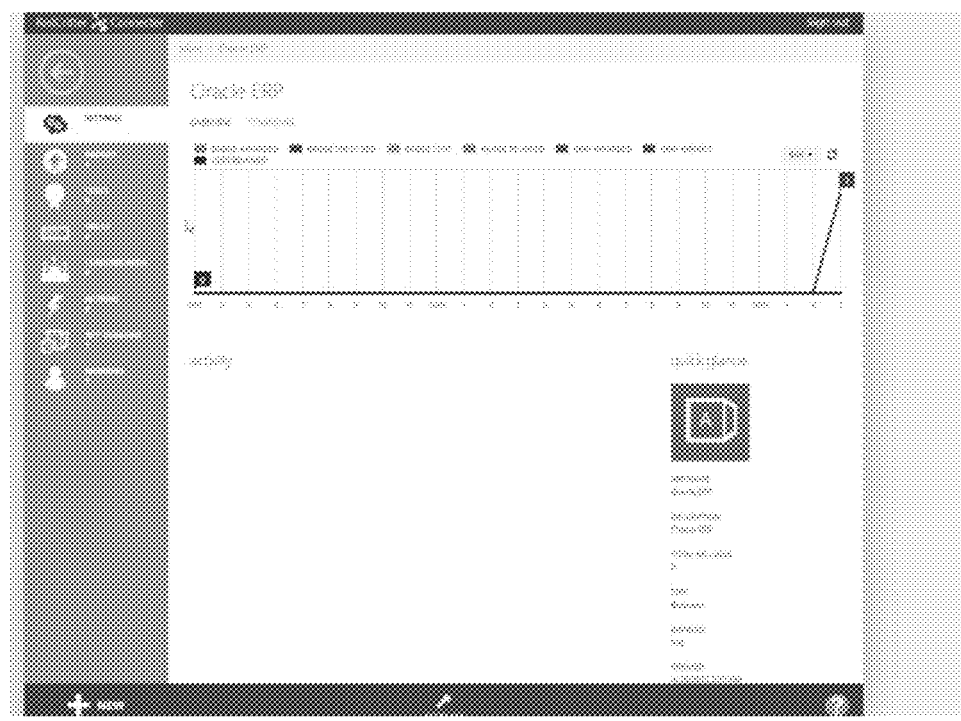
FIG. 30 is an exemplary screen shot.
Figure 31:
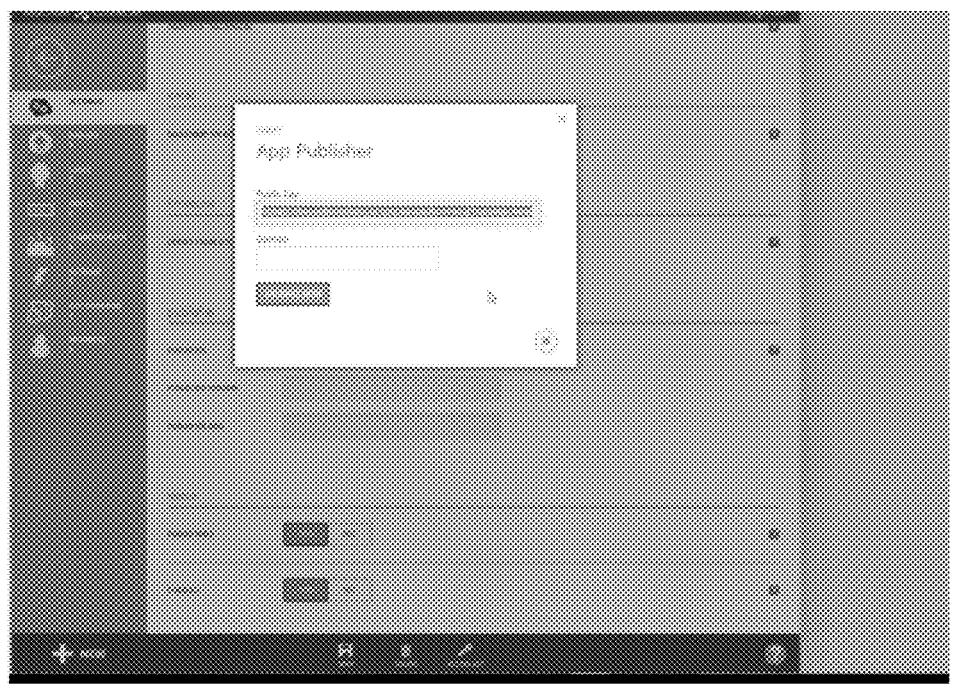
FIG. 31 is an exemplary screen shot including a key.
Figure 32:
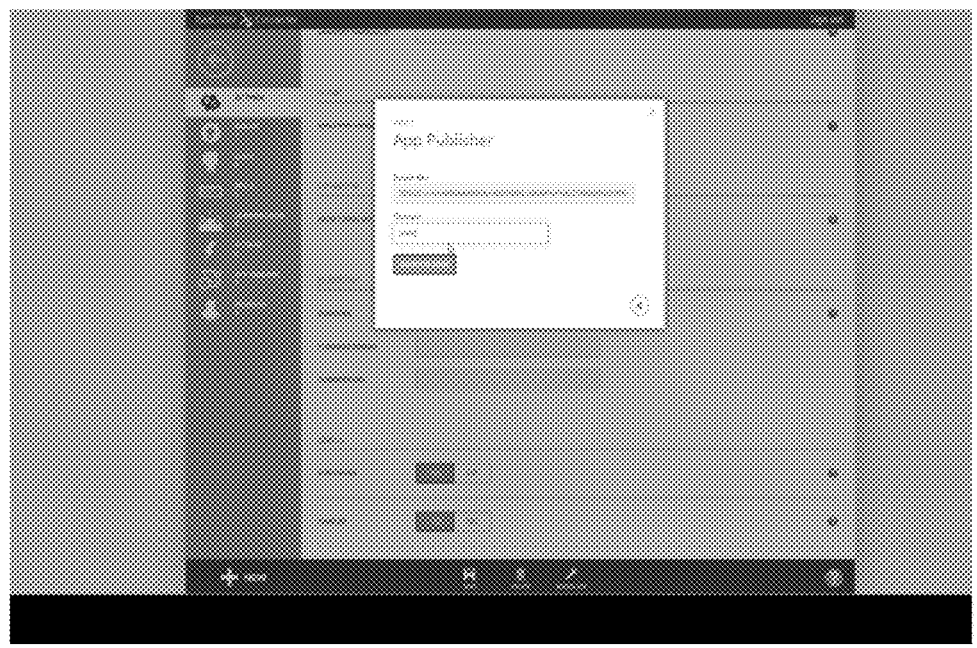
FIG. 32 is an exemplary screen shot including a key.
Figure 33:
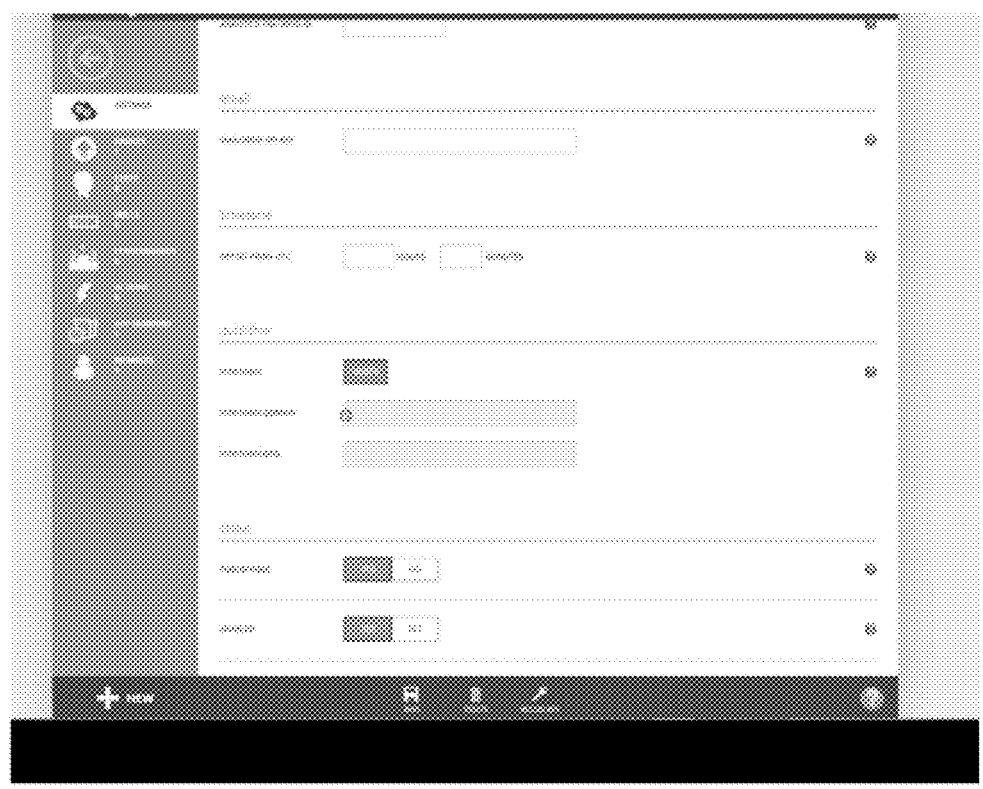
FIG. 33 is an exemplary screen shot of a dashboard.

FIG. 3 is a diagram of the exemplary functional components of environment 100. As shown in FIG. 3, storage device 250 may include at least one of subject ID component 320, action component 322, an action parameter component 324, indicator component 326, an instructions component 328, a unique identification component 330, a URL component 332, a subject profile component 334, and an administrator identification component 336. As discussed above, the components are for illustration, may not be mutually exclusive, and may be combined or subdivided. For ease of discussion, we separate the categories in this illustration.

The subject ID component 320 may be one or a set of unique identifiers assigned to a subject 145. The subject ID component 320 may be used by the client 105, server 110, processor 220 and otherwise to locate the particular subject with whom profile data is associated.

The action component 322, may store actions when entered into the system by an administrator and/or may be preloaded with a selection of actions. An action refers to an act that results from the triggering event (e.g., a client accessing a proximity device) assuming that the criteria for the action are met. Exemplary actions include but are not limited to adding to or deleting from points in a subject's profile; awarding, removing, or modifying icons (e.g., badges, certificates) on a subject's profile.

An action parameter component 324, may store parameters associated with each action. For example, the type of action to be distributed (e.g., points, icons, badges, certificates), the quantity of items to be distributed, the expiration date, criteria that must be met (length of time in the meeting, arriving on time, completing prerequisites).

The indicator component 326, may store individual indicators. For example a particular indicator 315, which may be a visual graphic representing the result of an action (e.g., representing a skill, completion of a certification, completion of a challenge). The indicator component 326, may include information about indicators 315 such as an indicator or graphic associated with the action, alternative and/or additional indicators or graphics associated with achievement of a level of a skill, alternative and/or additional indicators or graphics associated with e.g., the highest level of achievement of the skill, the recency of the skill, the current level of the skill, or otherwise The instructions component 328, may store the logic for determining (e.g., using information from subject profile component 334, action parameter component 324 and other elements of the system) whether an action is fulfilled. Among other things, it may also store instructions on how to program a proximity device 120, how to receive a proximity payload 340, how to assign unique ID's to a category of data, or how to associate a unique URL 360 to a unique ID 350.

A unique identification component 330, may be one or a set of unique identifiers assigned to an action, e.g., stored in action component 322. Additionally or alternatively, the unique identification component 330 may be associated with the parameter's associated with that an action.

A URL component 332, may store information associating a unique ID to a unique URL.

A subject profile component 334, may store, among other information, the subject's name, email addresses, and icons, points, certificates, or other items earned by the subject 145. This collection of information for a particular subject will be referred to generally as a subject profile 310. In FIG. 3, two subject profiles 310(*a*) and 310(*b*), which are assumed to pertain to two different subjects, are shown.

An administrator identification component 336, may store unique ID's for administrators and associated data such as authentication data, actions created, actions awarded, or otherwise.

The Example that follows introduces one variation of the system, method, and software system. This summary is intended to be illustrative and not limiting.

FIG. 3 provides an example of how information about a subject 145 may be collected and reported to a subject profile 310. A publisher 140 may enter a system, method, and software product via an input device 260, which may be a client 105. A browser 115 on a client 105 presents the publisher 140 with a programming dashboard 125 that includes a field providing the option to, for example, create an action. Through the programming dashboard 125 displayed on the browser 115, the publisher 140 may associate the action with an indicator 315 for display on a subject profile 310 when the action is triggered. The publisher 140 may further assign parameters to the indicator 315, e.g., number of indicators 315 available for issue, expiration time, etc. The publisher 140 entered data would be received by a server 110 and stored in a storage device 250.

A user, such as a subject 145, may obtain a subject profile 310 on the system, method, and software product in more than one way. The subject 145 may initiate the subject profile 310. Alternatively or additionally, the subject 145 may claim a subject profile 310 initiated by a publisher 140.

In a first variation, a subject may access the system, method and software product and create a profile through, e.g., a website provided to generate and maintain unified profiles. A subject 145 may enter a system, method, and software product via an input device 260, which may be a client 105. A browser 115 on a client 105 presents the subject 145 with a programming dashboard 125 that includes a field providing the option to, for example, create an account. Through the programming dashboard 125 displayed on the browser 115, the subject 145 may provide basic information, for example, name and email address. The system, method, and software product will associate the basic information with, for example, subject profile data, subject identification data, or similar. The system, method, and software product may create an account for the subject 145 associated with subject 145 log in credentials.

The system, method, and software product associates each subject 145 account with a subject profile 310. The subject profile 310 belongs to the subject 145. In this case, if the subject profile 310 is not associated with a publisher 140, the subject 145 may manually populate the subject profile with basic information and may use the subject profile 310 as a business card. The subject profile 310 may include self-reported information, third party generated information, or both. The percentage of self-reported information to automatically generated and reported information will depend on the extent to which the subject 145 interacts with publishers 140.

In a second variation, a publisher 140 may issue an indicator 315 to a subject 145 who does not have an existing subject profile 310. The system, method, and software product, upon receipt of a request to assign an indicator to a subject 145 with no existing subject profile 310, will create a subject profile 310. The system, method, and software product will associate the indicator 315 with the subject profile 310. The system, method, and software product may associate with the subject profile 310 information about the subject 145 provided by publisher 140, e.g., name, email address, phone number, social media handle, etc. The system, method, and software product will send the subject 145 an invitation to claim its subject profile 310.

A subject 145 may associate with one or more publishers 140. The system, method, and software product may provide (e.g., via a programming dashboard 125) the subject 145 with the option to opt-in to a variety of publishers 140 having accounts. A publisher 140 may initiate association with a subject 145. A subject 145 may invite a publisher 140 to create an account on the system, method, and software product.

The subject 145 may begin accepting third party published icons such as badges, certificates. If they have a relationship with third parties using the system, they may associate with the third party publisher. The subject 145 may request that an organization or entity integrate the system, method and software product into their business systems so that organization or entity may become a publisher 140 and publishing information such as badges, certificates, skills onto the subject's 145 subject profile 310.

The system, method, and software product provides a location existing, for example, on the internet or cloud wherein multiple organizations and entities can easily integrate gamification into existing or adopted business systems. Within the system, method, and software product, each organization or entity can create their own application within the unified system, method, and software product and the subject 145 can subscribe or "opt in" to the various publishers' 140 applications. The subject 145 may opt in to an application provided by a publisher 145 (all existing on a unified system, method, and software product) and when the subject 145 opts in to a particular application, the publisher 140 owning the particular application can publish to the subject's 145 subject profile 310. The resulting subject profile, e.g., FIG. 3, 310(*b*), may have information published by multiple publishers 140, each publishing data generated in some instances from independent individual and in house residing enterprise servers, etc.

The subject 145 owns its subject profile 310 and if it stops working for Company A, the subject 145 can go to Company B and it will retain all of my information from Company A. All of the Applications opted into all go into the one profile. They can each come from a different publisher 140.

In a variation, different publishers 140 may know a subject 145 by a different email address, phone number, social media handle or otherwise. For example, a subject 145, in this case "Bill," may work for Company X, a business using a CRM system. Company X may know Bill by his work email address (e.g., bill@companyx.com). However, Bill may have a different email in a different system, e.g. a SHAREPOINT email address for a Company Y (e.g., bill@companyy.com). In this example (for purpose of illustration) Company Y may be a company Bill is consulting for. A unique feature of the disclosed system and method is the ability of various publishers 140, in this example, the system of publisher Company X and the system of publisher Company Y to post content (e.g., awards and badges) to Bill's profile without knowing Bill's unified profile log in information, log in user name, or otherwise. Each publisher 140 system, e.g., the system of Company X and the system of Company Y may know the subject 145 (e.g., Bill) by the email address, telephone number, social media handle, etc., assigned or otherwise used by the publisher's 140 individual system to identify the subject 145. The system, method and software product is capable of linking all of the email addresses to the subject's 145 subject profile 310.

The system, method, and software product allow multiple publisher 140 systems, e.g., the systems of publisher Company X and the systems of publisher Company Y, to interact with subject's 145 subject profile 310, based on the contact identifier (e.g., email, phone number, handle, etc.) publisher 140 Company X and publisher 140 Company Y associates with subject 145. In this example, the contact identifiers, e.g., email addresses differ. If they don't know the email the subject 145 uses to log in to the system, method, and software product, it makes it easier because the various systems do not need to know the subject's 145 login email or identity, they do not have to map over the identity. This makes it easier for those systems to publish the subject 145 accomplishments, track subject 145 skills, or provide other information to subject profile 310 because they do not have to map over subject 145 identity. Each of Company X and Company Y may just use the existing contact identifier, e.g., email by which they identify the subject 145 and it all goes to the same subject profile 310.

Becoming a Publisher in the System

In a variation, the system, method, and software product (Unified Profile System) may provide the ability to gamify a system within a company, e.g., Company X. In this example, Company X may wish to gamify an internal system e.g., an ERP system. The Platform System may provide the ability for a Developer working for Company X to gamify an internal system, e.g., ERP system. In this example, a Developer for Company X would create a developer account in the Unified Profile System. The Developer for Company X may become a publisher of user based (e.g., iconic representations of performance based information) for example but not limited to awards, badges, certificates, awards, skill reporting, or otherwise.

The Unified Profile System provides the ability for the Developer to create a Company X application. For example, the System may deliver to a browser a dashboard providing the option to request creation of a "New Application." The Developer would indicate, by interacting through the programming dashboard of the user interface, the desire to create a new application. The indication (e.g., by clicking a button, or choosing an option in a drop down menu) may trigger the system to initiate the sequence of instructions for creating a new application. In this example, the Developer would indicate the desire to create a new application involving gamification of its ERP system. In this example, Company X may run an ERP system such as ORACLE system. Company X may wish to gamify the system by building in e.g., iconic representations of performance based information such as but not limited to badges, certificates, awards, and skills.

The Developer indicates its choice to "Create an App." The system may further allow the User to create a custom badge for the App, choose an existing badge for the app, or otherwise. The application has an icon. The system may further allow the Developer to add a description. Company X will have an App to which User's may subscribe. Once the user subscribes, the App may be indicated on the User's profile by it's icon. Alternatively or additionally, the App may be indicated by its icon only in the App selection catalogue.

Within Company X application, the Developer may create icons, e.g., icons representing meeting goals, indicating performance of skills, indicating user behaviors, or otherwise. In one example, Company X may create a badge called the "Early Bird" badge. The exemplary "Early Bird" badge may be awarded to a User as an award for signing in early to the Company X ERP system, (in this example, the ORACLE system). The badge may be associated with an icon. The System may provide the Developer with the ability to use an image of Developer's choice to create the badge icon. Alternatively, the system may provide the Developer with a selection of previously generated badge icons to choose from.

The System may award the badge to a user of Company X's ORACLE ERP system. When a User of the Company X ORACLE system performs the activity (e.g., logging in early to the ORACLE system) the ORACLE system may award the "Early Bird" badge to the User using the email address the ORACLE system uses to identify the User. It may award the badge to any User in the ORACLE system, e.g., knowing only the email address of the user stored in the ORACLE system. It does not need to know the User's Unified Profile System log in information, therefore simplifying the storage and identification of the User. Typically, a business system (e.g., ERP) knows a User by email address or user i.d., but they typically always have an email address associated with the User.

In one example, the ORACLE system, communicating with the Platform Unified Profile System, issues a badge to the User by the following exemplary method. An API is created. Issue an API call. The business system would use the secret key to initiate the API call. The business system would just call this weblink and say "award Early Bird badge to user@companyx.com." The Unified Profile System will receive the request. The Unified Profile System queries its database to determine whether user@companyx.com exists on the system. In this example, the Unified Profile System does not know the User, user@companyx.com. When the system does not know a User, it will send out an invitation to the User to join the Unified Profile System. The invitation may further opt the user into the Company X application. The User may thereby accept the award issued by Company X on the User's unified profile.

The User receives an email inviting the user to join the Unified Profile System. The User may be given the option to "Create an Account" if the User does not already have an account (as in this Example) or "Log In" to an account, if the user does already have an account (e.g., under a different email address. This will be exemplified further in a later paragraph of the description).

The above is an example of a novel "on boarding" process, a novel manner of enrolling users into the Unified Profile System.

In a second example, the user may have an existing account in the Unified Profile System, e.g., under a different email address. In this case, the email sent out by the Unified Profile System provides the option of adding the badge to an existing User profile. The user merely follows the link from the email (e.g., by clicking "add to existing profile"). The link may take the user to the Unified Profile System log in prompt. The User merely enters User's log in information and the User's additional email address (e.g., user@companyx.com) will be associated with the User's profile, e.g., the User's profile stored in a database on a memory device associated with the Unified Profile System. The User may further be enrolled or "opted in" to the Company X App. The Early Bird badge awarded to User will then be displayed on the User profile. The entire activity may be triggered simply by logging in. By logging in from the link from the email, the Unified Profile System may receive the information, e.g., the Company X App information, the additional User email information, and the Early Bird Badge information. The Unified Profile System may associate this information with the User Information stored on a storage device for future retrieval.

To further demonstrate the System, the User may perform an act in the Company X Oracle system, and the act may trigger, e.g., a "Working Late" badge. The Oracle system will automatically send a call over the API to the Unified Profile System. The Unified Profile System will receive the call. The Unified Profile System will then query the database for user@companyx.com. The System will find the email address, user@companyx.com in its database associated with User. In this case, the Unified Profile System will not send an invitation email to the User, rather, it will automatically display the Working Late badge on the User profile. The System may update its database, e.g., the User Profile to indicate the award of the Working Late badge. The System may further update any other systems that rely or depend upon the information e.g., badge triggering.

The User may opt-in to the Company X Application simply by following the link from the email. The Unified Profile System, receiving the call created by the User triggering the link, maps into the User Profile the information, e.g., the User's additional email address, the badge, and the Company X application. The log in is what links the system to the profile. While the Unified Profile System may not send an invitation email upon receipt of a subsequent badge from the Company X, the Unified Profile System may send other emails to the User, such as an email alerting the User to the badge award or profile update or otherwise. The sending of additional emails may be a function of User profile settings requesting or rejecting such email alerts.

Any organization may create an application in the Unified Profile System. For example, STARBUCKS may create an application and therefore be able to publish icons, e.g., badges, awards, certificates, to the User Profile. They are all connected to the single profile. If the User opts into them they are all linked up. The user can opt in to them either by receiving the email or by electing to opt in to them, e.g., by selecting the Application the User wishes to opt in to from a catalogue. If a User wishes to receive performance related data from an organization that does not have an Application account (e.g., does not currently have the ability to publish awards to User profiles in the Unified Profile System) the User may, similarly, invite the Organization to join the Unified Profile System.

The System may also provide the ability of the User to hide badges on a select basis. For example, the User may have on its profile badges earned from a Leisure Organization (e.g., a golf course, a social club, an online game, a local restaurant). The User may wish to control how the profile is viewed by others. For example, the User may only want Company X to see badges awarded to it by Company X and Company Y. The User may indicate its selection and "turn off" the view of the badges when viewed by Company X. For example, when Company X makes an API call to the Unified Profile System to request to see the badges of User B, the Unified Profile System will only display to Company X the badges User B authorized. User B may restrict other profile data from Company X, in which case the Unified Profile System will wall off the data User B wishes to restrict from Company X.

The System and Method for unifying personal accomplishments across multiple publishers permits a User to create a User profile which may, by subscribing or opting in to multiple providers (e.g., employers, social organizations, vendors, restaurants, etc.) display various personal accomplishments on one profile.

The User may unify its identities across multiple publishers by clicking an email link sent to the email address the publisher has on file for that user, which may be an email reporting the award of a badge and/or inviting the User to join the Unified Profile System or add the Publisher to the User's existing profile account.

Existing systems do not have the ability to display badges cross platform onto one unified profile. Other systems require manual entry or maintenance of multiple email addresses into the profile, and/or do not allow the linking of multiple email addresses for one user.

Other enterprise systems require that a user manually map their user profiles across systems and/or manually enter the data. In the disclosed process, the Application (e.g., Company X application) never needs to know the User by any identification other than the email address Company X has for the User (e.g., user @ companyx.com). This is because the disclosed System links them up, automatically links the systems to the Unified User Profile as the badges are awarded.

Also disclosed is a system and method for verifying the authority of the Publisher, e.g., verifying the authority of the Application publishing the accomplishment to a User profile. This may comprise a method of ensuring accomplishments (e.g., as represented by icons or otherwise) are published by the specified publisher.

In a complex system allowing multiple publishers to grant awards to users it is helpful to have a method to verify the authenticity of the virtual award provider. In this way people viewing a user's virtual accomplishments can determine with certainty that the provider granting the award is authentic.

In one example, a User G may have a badge on its User Profile, e.g., a badge from HP for ERP development skills. Individuals viewing the User G Profile may want to validate that the badge was actually awarded by HP, e.g., that User G did not merely create the badge purporting to be an HP badge and add it to its account.

When a Developer creates an App, e.g., during creation of Company X's ORACLE APP, the system provides the Developer the option of providing verification of the authenticity of the source of Company X awarded icons.

The System provides the ability for a Publisher (e.g., Company X) to verify itself. When the Developer for Company X is logged into the system, e.g., when the Developer is creating the App or at a later time, the Developer System will display to the Developer via a user interface, the option to Verify. The Developer elects to Verify, sending instruction to the Unified Profile System Interface to execute the verification source code. The System may generate a secret key. The System may send back to the Developer a secret key.

The Developer takes the secret key generated by the System, into the DNS server. The Developer accesses its web server through the web server web portal administering the Company X domain names. The Developer enters, e.g., the DNS management portion of its web server administration account. The DNS management portion of the web server administration account has a region where one may add strings of values onto the web server associated with the domain name. The Developer utilizes the web server administration account add function to add the secret key provided by the Unified Profile System verification process. This secret key entered into the web server will associate the secret key with the webserver. The Developer may then return to the Unified Profile System verification prompt and trigger the System to check the web server associated with Company X for the secret key. Upon receiving the instruction from the Developer, the Unified Profile System will query the web server for the secret key. If located, the Unified Profile System will indicate Company X as "verified." The System may make the determination that Company X is "verified" (e.g., Company X is authentic versus an imposter posing as Company X) due to the fact that the Developer was able to make the change to the web server.

As further verification, the Unified Profile System may check the web server and/or other information associated with the Company X website, to determine whether, e.g., Company X has an SSL certificate (secure connection certificate). The SSL certificate may include an embedded company name. The Unified Profile System will read the certificate including any embedded company name. The SSL certificate may use the certificate typically used for eCommerce, for the different purpose of verifying the identity of the Publisher, e.g., Company X. For example, the verification may be associated with all badges issued from the Publisher. Those viewing a User's profile may investigate the verification state of the icon by, e.g., clicking the icon (which may take the viewer to a new page displaying the verification) alternatively or additionally the icon may incorporate a visual indicator of verification state.

The result may be, for example, a User profile, which may be used as a resume. The resume may have increased accuracy over self-reported profiles such as those on LinkedIn. The User Profile may be the equivalent of a resume that cannot be easily faked.

Alternatively or additionally, the User Profile may be an equivalent or replacement for a business card. The User Profile may be transferred to other individuals via devices capable of delivering proximity payloads, for example but not limited to NFC, QR codes and the like.

In all variations, it should be understood that the description of the system, method, and software product is likewise a description of a non-transitory computer-readable medium (e.g., storage device 250) storing a program (a set of instructions) for performing the process. The storage device 250 can store (in any appropriate format) those program elements appropriate to perform the method. Further, each process involves a processor 114 receiving instructions (e.g., from a storage device 250), and executing those instructions, thereby performing one or more processes.

The server 110, via a processor 220, checks the action parameters to determine whether the transaction meets the configured requirements for performing the action (e.g., updating the subject's profile 310 with information). In the example above, the server 110 via the processor 220 may analyze the subject's profile data to determine whether the appropriate prerequisites are met. In another example, the server 110 via the processor 220 may analyze existing transaction data (e.g., data updated and stored on the database and associated to the unique ID relating to whether the action has expired). If the parameters are not met, a response is sent to the client 105 (e.g., for display on a browser) indicating unsuccessful transaction.

If the parameters are met, the server 110 processes the results of the transaction, updating the Action and parameters in the storage device. If the parameters are met, a success response will be transmitted to the client 105. The success response may include any associated action, such as the delivery of a visible indicator to a subject profile.

In another variation, an icon representing an accomplishment can be identified as a badge, certificate, or skill. An entity can create a virtual identity to which users can opt in. The entity may be a publisher capable of publishing icons to user profiles.

Each user may have a single profile that multiple apps, potentially run by any number of companies, can publish content into. New users are on-boarded into the system by being invited, e.g., via email, text, or otherwise with a link to the Unified System. Both the user and the application may control view permissions are handled both by the app and the end user.

Master member data may include (email, phone number, password).

Provider member data (user id, email, phone number, password) (one or more providers are supported). Provider can be a company, app or other entity.

The following is an exemplary description of the method. In all variations, it should be understood that the description of the system, method, and software product is likewise a description of a non-transitory computer-readable medium (e.g., storage device 250) storing a program (a set of instructions) for performing the process. The storage device 250 can store (in any appropriate format) those program elements appropriate to perform the method. Further, each process involves a processor 220 receiving instructions (e.g., from a storage device 250), and executing those instructions, thereby performing one or more processes.

Start

Provider issues API call to a computing device to award/remove or otherwise manage an icon, e.g., a virtual award, for member identified by an email address (telephone number or similar communication key) already known to the provider or provided to the provider by the user.

The API call initiates logic to determine if the user is already registered for the provider based on the email address.

If the user is not found . . . system initiates On-boarding Sequence

If the user is found system initiates Profile Updating Sequence On-boarding Sequence On-boarding Sequence 1) An invitation record is generated linking the original action the API was requesting to an invitation code which is generated at this time.

2) A link is generated containing the invitation code or some encrypted or hashed version which represents the invitation code. This link is used by members that are not already in the master Member data. If clicked goto Activating new Master/Provider Sequence. (In all variations, link may be sent to user by email, text message, NFC code, QR code, or other communication means.)

3) A similar link is generated with a second identifier or alternate URL. This link is displayed for use by members already registered in the Master member data. If clicked goto Activating new Provider Member Sequence.

Activating new Master/Provider Sequence

1) Link opens web page, 2) logic retrieves invitation code from link, 3) Logic looks up invitation code, 4) validates it exists from persistent store. 5) User registration form is presented. 6) User completes form entering their email address (or other communication form such as phone number) (optionally) pre-populated from data extracted in the link, or invitation code record. 7) A new unique user id is generated in the master database, User record is stored in Master member data, user record is also stored in provider member data. Unique user id is stored with both records for cross referencing.

(Optionally) User record(s) are flagged as not activated. Activation email is sent containing link with activation code, link is clicked, activation code is parsed, user record(s) are located and marked as activated.

Goto Profile Updating Sequence

Activating new Provider Member Sequence

1) Link opens web page, 2) logic retrieves invitation code from link, 3) Logic looks up invitation code, 4) validates it exists from persistent store. 5) User login form is presented. 6) User completes form entering their email address or userid and password for their master account 7) User's login is validated against the master database, user's unique user id is retrieved. 8) User record created in provider member data and unique user id from master storage is also stored with the new user record for cross referencing.

Goto Profile Updating Sequence

Email address (or other communication means by which an email link may be sent to trigger the opening of a webbrowser) that the provider initiated the sequence with need not match the email address that the user used in their master user login. The unique ID that is generated allows cross referencing users in a provider's storage against the user records in the master database. The net effect of this allows providers to each retrieve the user record by the email address that it knows even though the user's email address in the master record could be different since the unique user id has been linked across the systems.

The data may exist as one record in the master for each user along with the user's credentials, Each provider can retrieve a user record by email address (or similar identifying indicia), which always has a unique user id that relates back to a single record in the master database. In this way the master may, e.g., have 1 record per user, and each provider also has one record per user. So a single user can have 1 master record and multiple user records, one for each provider they have joined.

Profile Updating Sequence

The original API parameters are retrieved from the stored invitation code. The API is executed now that the user is a member.

Provider can execute API calls to modify any member's trophies by passing secret key or id representing Provider along with the email address representing the profile that the Provider knows.

Provider Settings when Defining Trophies

Provider creates definitions of trophies, Provider can set boolean flag to mark entire content as publishable or not. Provider can set finer grain controls for each definition of every trophy as publishable or not.

Determining Visibility of Trophies on a Profile

Trophy is awarded/revoked or modified on profile by a Provider. If publishable at the publisher and trophy definition level, trophy is visible to the public on the profile page or profile data feed.

User can choose to delete any trophy from their profile, This removes it from all profile views and data feeds except the Provider's.

Composition of User Profile

Each profile can have one or more Providers, each Provider can publish and manage or more trophies on the profile.

Profile 1 . . .

Provider 1 . . . Provider n

Trophy 1 . . . Trophy n Trophy 1 . . . Trophy n

One User, Multiple Providers

Single user can have any number of records, 1 per Provider, each potentially with a different email address but related to a single user record in the Master by a Unique User ID The following represents a single user with 2 providers Master Unique User ID (a), Username and or email (a), password Provider 1 . . .

Unique User ID (a), email (b)

Provider 2 . . .

Unique User ID (a), email (c)

In a further variation, a method of verifying the identity may provide the ability for certifying the accuracy of materials. This may be applied in many exemplary situations. For example, a recruiting firm may wish to attach a document certifying that a person's education has been background checked and verified. The firm would upload the document to the disclosed application and the document would be verified as coming from the firm the same as described above for a badge or certificate.

This allows a future employer to, for example, through a secure link provided by the profile owner, retrieve the document and know that it has been verified as being uploaded by the firm.

This would allow firms, colleges, employers, and otherwise to attach documents to user profiles. The documents could be verified as to who attached them.

Storing verified documents may include the following steps (as demonstrated in figures)—Machine transmits a API request to server containing an App identifier, and API parameters and binary attachments. The server retrieves the App record and authenticates the request. If the App is located and request authenticated successfully, the request is processed and the document is stored in persistent storage, relational records is created, relating to the document Application and Profile. This may then go to document storage. Alternatively or additionally the information may go to a description record of the document that is persisted relating the document to the profile. This may be stored in user profile data. If the App located and requested is not authenticated, the request will be denied.

What follows is an exemplary method of providing third party access to verified data. In one example, a user vies a document related to the users profile. The user chooses whether to share the document by selecting and requesting a secure link to the document. The server generates a unique link with access code built in to allow third party access to the document. The user distributes the link to authorized viewers.

Upon receiving the link or otherwise, the authorized viewer clicks the link provided by the user (or another authorized to do so). The server decodes authorization and validates access to the secure document. The document is retrieved from document storage. The request for viewing the document is logged for historical reporting. A historical log data may exist on the storage device for storing and delivering this information. The document is transmitted over the network to the authorized viewer.

The invention is not limited to the embodiments illustrated and described, as it also covers all equivalent implementations insofar as they do not depart form the spirit of the invention. Further, the invention is not yet limited to the combination of features as described herein but may be defined by any other combination of all of the individual features disclosed. Further, the invention is not yet limited to the sequence of method steps as described herein but may be defined by any other combination or order the steps disclosed. Any person skilled in the art of will recognize from the previous detailed description and from the figures and claims that modifications could be made to the disclosed embodiments of the invention without departing from the scope of the invention.

The invention claimed is:

1. A method, performed by a unified profile system, for generating a unified user profile comprising:

receiving, from a first company, a first request to create a first publisher application in the unified profile system to thereby allow the first company to function as a publisher in the unified profile system;

in response to the first request, creating a first application programming interface in the unified profile system for the first publisher application, the first application programming interface being configured to receive requests from the first company to issue an award to a user of the unified profile system;

receiving, from the first company and via the first application programming interface, a second request to issue a first award to a first user of the unified profile system, the second request including a first email address of the first user;

in response to the second request, accessing a database of user profiles that have already been created in the unified profile system to determine whether the first email address is associated with one of the user profiles in the database;

upon determining that the first email address is not associated with any of the user profiles in the database, sending an email to the first email address that indicates that the first award has been issued to the first user;

in response to sending the email to the first email address, receiving login credentials from the first user, the login credentials being associated with a first user profile of the user profiles in the database, the first user having previously established the first user profile with the unified profile system using a second email address different from the first email address such that the second email address is associated with the first user profile, the first user profile comprising a master record that defines an association between a unique identifier of the first user and the second email address, and a first publisher record that defines an association between the unique identifier of the first user and the second email address;

updating the first user profile to associate the first email address with the first user profile such that the first email address and the second email address are associated with the first user profile, wherein updating the first user profile comprises creating a second publisher record that defines an association between the unique identifier of the first user and the first email address and associating the first award with the second publisher record;

receiving, from a second company and via a second application programming interface, a third request to issue a second award to the first user of the unified profile system, the third request including a third email address of the first user;

in response to the third request, accessing the database of user profiles to determine whether the third email address is associated with one of the user profiles in the database; and upon determining that the third email address is associated with the first user profile, updating the first user profile to associate the second award with the first user profile by creating a third publisher record that defines an association between the unique identifier of the first user and the third email address and associating the second award with the third publisher record.

2. The method of claim 1, further comprising:
in conjunction with creating the first application programming interface, generating and providing a secret key to the first company;

after the secret key has been provided to the first company, querying a web server of the first company to detect whether the secret key is located on the web server;

in response to locating the secret key on the web server, updating the first application programming interface to have a verified status.

3. The method of claim 2, further comprising:
determining that the second request includes the secret key that was provided to the first company;

based on the second request including the secret key, setting a characteristic of the first award to verified; and displaying the first award with an indication that the first award has been verified when the first user profile is displayed.

4. The method of claim 1, wherein the login credentials include the second email address.

5. The method of claim 1, further comprising:
receiving, from the first company and via the first application programming interface, a fourth request to issue the first award to a second user, the fourth request including an email address of the second user;

in response to the fourth request, accessing the database of user profiles to determine whether the email address of the second user is associated with a user profile in the database;

upon determining that the email address of the second user is not associated with a user profile in the database, sending an additional email to the email address of the second user that indicates that the first award has been issued to the second user;

in response to sending the additional email to the email address of the second user, receiving a request to create a user profile for the second user in the unified profile system;

creating a user profile for the second user; and
associating the first award with the user profile for the second user.

6. The method of claim 1, further comprising:
receiving input from the first user that requests that the first award not be visible to other publishers; and updating the first user profile to indicate that the first award should not be visible to any publishers other than the first company.

7. The method of claim 6, wherein updating the first user profile to indicate that the first award should not be visible to any publishers other than the first company comprises removing an association between the first award and any publisher record in the first user profile that does not correspond to the first company.

8. The method of claim 1, further comprising:
receiving, from the first company, a request to revoke the first award from the first user; and updating the first user profile to remove the association between the first award and the second publisher record.

9. The method of claim 8, wherein the first user profile is updated to remove the association between the first award and the second publisher record in response to determining that the request to revoke the first award from the first user is received via the first application programming interface and includes a secret key that was provided to the first company as part of creating the first application programming interface.

10. A method, performed by a unified profile system, for generating a unified user profile comprising:
creating a user profile for a first user, the user profile including a master record that defines an association between a unique identifier and a first email address of the first user;

updating the user profile for the first user to include a publisher record for a first company, the publisher record defining an association between the unique identifier and a second email address of the first user;

receiving, from the first company and via a first application programming interface, a first request to issue a first award to the first user, the first request including the second email address;

in response to the first request, accessing a database of user profiles to determine whether the second email address is associated with a user profile in the database;

upon determining that the second email address is associated with the user profile of the first user, updating the user profile of the first user to associate the first award with the user profile, wherein updating the user profile of the first user to associate the first award with the user profile comprises associating the first award with the publisher record for the first company;

receiving, from a second company and via a second application programming interface, a second request to issue a second award to the first user, the second request including a third email address of the first user;

in response to the second request, accessing the database of user profiles to determine whether the third email address is associated with one of the user profiles in the database; and upon determining that the third email address is associated with the user Profile of the first user, updating the user profile of the first user to associate the second award with the user profile, wherein updating the user profile of the first user to associate the second award with the user profile comprises associating the second award with a publisher record for the second company.

11. The method of claim 10, wherein the user profile for the first user includes one or more additional publisher records each of which pertains to a different company and defines an association between the unique identifier and another email address of the first user.

12. The method of claim 10, further comprising:
receiving, from a third company, a third request to issue a third award to the first user, the request including a fourth email address of the first user;

in response to the third request, accessing the database of user profiles to determine whether the fourth email address is associated with a user profile in the database;

upon determining that the fourth email address is not associated with a user profile in the database, sending an email to the fourth email address that indicates that the third award has been issued to the first user;

in response to sending the email to the fourth email address, receiving login credentials from the first user, the login credentials being associated with the user profile of the first user; and updating the user profile of the first user to associate the fourth email address with the user profile of the first user.

13. The method of claim 12, wherein updating the user profile of the first user to associate the fourth email address with the user profile of the first user comprises creating a publisher record for the third company within the user profile, the publisher record for the third company defining an association between the unique identifier and the fourth email address.

14. The method of claim 13, wherein updating the user profile of the first user further includes associating the third award with the publisher record for the third company.

15. One or more non-transitory computer readable media storing computer executable instructions which when executed by one or more processors implement a method for generating a unified user profile in a unified profile system, the method comprising:

receiving, from a first company, a first request to create a first publisher application in the unified profile system to thereby allow the first company to function as a publisher in the unified profile system;

in response to the first request, creating a first application programming interface in the unified profile system for the first publisher application, the first application programming interface being configured to receive requests from the first company to issue an award to a user of the unified profile system;

receiving, from the first company and via the first application programming interface, a second request to issue a first award to a first user of the unified profile system, the second request including a first email address of the first user;

in response to the second request, accessing a database of user profiles that have already been created in the unified profile system to determine whether the first email address is associated with one of the user profiles in the database;

upon determining that the first email address is not associated with any of the user profiles in the database, sending an email to the first email address that indicates that the first award has been issued to the first user;

in response to sending the email to the first email address, receiving login credentials from the first user, the login credentials being associated with a first user profile of the user profiles in the database, the first user having previously established the first user profile with the unified profile system using a second email address different from the first email address such that the second email address is associated with the first user profile, the first user profile comprising a master record that defines an association between a unique identifier of the first user and the second email address, and a first publisher record that defines an association between the unique identifier of the first user and the second email address; and updating the first user profile to associate the first email address with the first user profile such that the first email address and the second email address are associated with the first user profile, wherein updating the first user profile comprises creating a second publisher record that defines an association between the unique identifier of the first user and the first email address and associating the first award with the second publisher record;

receiving, from a second company and via a second application programming interface, a third request to issue a second award to the first user of the unified profile system, the third request including a third email address of the first user;

in response to the third request, accessing the database of user profiles to determine whether the third email address is associated with one of the user profiles in the database; and upon determining that the third email address is associated with the first user profile, updating the first user profile to associate the second award with the first user profile by creating a third publisher record that defines an association between the unique identifier of the first user and the third email address and associating the second award with the third publisher record.

* * * * *